United States Patent
Imai et al.

(10) Patent No.: US 10,930,142 B2
(45) Date of Patent: Feb. 23, 2021

(54) REMOTE CONTROL DEVICE AND REMOTE CONTROL SYSTEM

(71) Applicant: HONDA MOTOR CO., LTD., Tokyo (JP)

(72) Inventors: Naoko Imai, Wako (JP); Genesio Chang, Wako (JP); Ken Oiwa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/549,659

(22) Filed: Aug. 23, 2019

(65) Prior Publication Data

US 2020/0082708 A1 Mar. 12, 2020

(30) Foreign Application Priority Data

Sep. 11, 2018 (JP) .............................. JP2018-169611

(51) Int. Cl.
G08B 1/08 (2006.01)
G08C 17/02 (2006.01)
G06F 3/16 (2006.01)

(52) U.S. Cl.
CPC .............. *G08C 17/02* (2013.01); *G06F 3/167* (2013.01); *G08C 2201/42* (2013.01); *G08C 2201/91* (2013.01); *G08C 2201/93* (2013.01)

(58) Field of Classification Search
CPC ................ G08C 17/02; G08C 2201/42; G08C 2201/91; G08C 2201/93; G06F 3/167
See application file for complete search history.

(56) References Cited

U.S. PATENT DOCUMENTS

| | | | | |
|---|---|---|---|---|
| 9,679,463 | B1* | 6/2017 | Clark | G08C 17/02 |
| 10,008,108 | B2* | 6/2018 | Cho | H04L 12/2818 |
| 2005/0206562 | A1* | 9/2005 | Willson | G01V 15/00 |
| | | | | 342/357.31 |
| 2005/0225453 | A1* | 10/2005 | Chang | G08C 17/00 |
| | | | | 340/12.22 |
| 2011/0212702 | A1* | 9/2011 | Howard | H04L 12/6418 |
| | | | | 455/404.2 |
| 2012/0154108 | A1* | 6/2012 | Sugaya | H04N 21/4126 |
| | | | | 340/5.1 |
| 2015/0339916 | A1* | 11/2015 | Chang | G10L 15/00 |
| | | | | 340/12.22 |
| 2015/0356862 | A1* | 12/2015 | Daoura | G08B 25/08 |
| | | | | 340/686.6 |

FOREIGN PATENT DOCUMENTS

JP 2015-224863 12/2015
JP 2015-226319 12/2015

* cited by examiner

*Primary Examiner* — Munear T Akki
(74) *Attorney, Agent, or Firm* — Rankin, Hill & Clark LLP

(57) ABSTRACT

In a remote control device, a confirmation information notifying part notifies confirmation information for transmission of a control instruction before the transmission of the control instruction by a control instruction transmitting part, in a case where when an operation instruction to a selected electronic device is input by an operation instruction inputting part, a same kind device determining part determines that a plurality of the electronic devices of the same kind as the selected electronic device exist, and the distance determining part determines that the distance between the selected electronic device and the remote control device is equal to or larger than the distance threshold value.

12 Claims, 14 Drawing Sheets

FIG.3

| REGISTRATION NO. | KIND OF DEVICE | NAME OF DEVICE | PLACEMENT BUILDING | PLACEMENT POSITION | ... |
|---|---|---|---|---|---|
| Ea-001 | AIR CONDITIONER | AIR CONDITIONER IN LIVING ROOM OF OWN HOME | OWN HOME | (La001, Lo001) | ... |
| Ea-002 | AIR CONDITIONER | AIR CONDITIONER IN BED ROOM OF OWN HOME | OWN HOME | (La001, Lo001) | ... |
| Ea-003 | LIGHTING DEVICE | LIGHTING DEVICE IN LIVING ROOM OF OWN HOME | OWN HOME | (La001, Lo001) | ... |
| ... | ... | ... | ... | ... | ... |
| Ea-011 | AIR CONDITIONER | AIR CONDITIONER IN LIVING ROOM OF SUMMER HOUSE | SUMMER HOUSE | (La002, Lo002) | ... |
| Ea-012 | AIR CONDITIONER | AIR CONDITIONER IN BED ROOM OF SUMMER HOUSE | SUMMER HOUSE | (La002, Lo002) | ... |
| Ea-013 | LIGHTING DEVICE | LIGHTING DEVICE IN LIVING ROOM OF SUMMER HOUSE | SUMMER HOUSE | (La002, Lo002) | ... |
| ... | ... | ... | ... | ... | ... |

FIG.9

| REGISTRATION NO. | KIND OF DEVICE | NAME OF DEVICE | PLACEMENT BUILDING | IP ADDRESS OF RELAY SERVER | ... |
|---|---|---|---|---|---|
| Ea-001 | AIR CONDITIONER | AIR CONDITIONER IN LIVING ROOM OF OWN HOME | OWN HOME | RsIP-001 | ... |
| Ea-002 | AIR CONDITIONER | AIR CONDITIONER IN BED ROOM OF OWN HOME | OWN HOME | RsIP-001 | ... |
| Ea-003 | LIGHTING DEVICE | LIGHTING DEVICE IN LIVING ROOM OF OWN HOME | OWN HOME | RsIP-001 | ... |
| ... | ... | ... | ... | ... | ... |
| Ea-011 | AIR CONDITIONER | AIR CONDITIONER IN LIVING ROOM OF SUMMER HOUSE | SUMMER HOUSE | RsIP-001 | ... |
| Ea-012 | AIR CONDITIONER | AIR CONDITIONER IN BED ROOM OF SUMMER HOUSE | SUMMER HOUSE | RsIP-001 | ... |
| Ea-013 | LIGHTING DEVICE | LIGHTING DEVICE IN LIVING ROOM OF SUMMER HOUSE | SUMMER HOUSE | RsIP-001 | ... |

FIG.11

| REGISTRATION NO. (141a) | KIND OF DEVICE (141b) | NAME OF DEVICE (141c) | PLACEMENT BUILDING (141d) | PLACEMENT POSITION (141e) | IP ADDRESS OF RELAY SERVER (141f) |
|---|---|---|---|---|---|
| Ea-001 | AIR CONDITIONER | AIR CONDITIONER IN LIVING ROOM OF OWN HOME | OWN HOME | (La001, Lo001) | HcIP-001 |
| Ea-002 | AIR CONDITIONER | AIR CONDITIONER IN BED ROOM OF OWN HOME | OWN HOME | (La001, Lo001) | HcIP-001 |
| Ea-003 | LIGHTING DEVICE | LIGHTING DEVICE IN LIVING ROOM OF OWN HOME | OWN HOME | (La001, Lo001) | HcIP-001 |
| ... | ... | ... | ... | ... | ... |
| Ea-011 | AIR CONDITIONER | AIR CONDITIONER IN LIVING ROOM OF SUMMER HOUSE | SUMMER HOUSE | (La002, Lo002) | HcIP-002 |
| Ea-012 | AIR CONDITIONER | AIR CONDITIONER IN BED ROOM OF SUMMER HOUSE | SUMMER HOUSE | (La002, Lo002) | HcIP-002 |
| Ea-013 | LIGHTING DEVICE | LIGHTING DEVICE IN LIVING ROOM OF SUMMER HOUSE | SUMMER HOUSE | (La002, Lo002) | HcIP-002 |
| ... | ... | ... | ... | ... | ... |

REMOTE CONTROL DEVICE AND REMOTE CONTROL SYSTEM

INCORPORATION BY REFERENCE

The present application claims priority under 35 U.S.C. § 119 to Japanese Patent Application No. 2018-169611 filed on Sep. 11, 2018. The content of the application is incorporated herein by reference in its entirety.

BACKGROUND OF THE INVENTION

Field of the Invention

The present invention relates to a remote control device and a remote control system.

Description of the Related Art

Conventionally, a device control system in which an operated device such as an air conditioner installed in a building is remotely controlled from a vehicle is proposed (for example, refer to Japanese Patent Laid-Open Nos. 2015-224863 and 2015-226319).

In the aforementioned conventional device control system, whether or not a distance between the vehicle and the building is below a predetermined distance threshold value is determined. In a case where the distance between the vehicle and the building exceeds the distance threshold value, the operated device is not remotely operated by the vehicle.

In the aforementioned conventional device control system, in the case where the distance between the vehicle and the building where the operated device is disposed exceeds the distance threshold value, a user cannot remotely control the operated device from the vehicle. Therefore, there is disadvantage that the user cannot remotely control the operated device unless the user approaches the operated device to some extent. Additionally, for example, in a case where the same kind of devices disposed at a plurality of positions such as a summer house and a workplace in addition to own home are objects to be remotely controlled, the user is likely to erroneously perform selection operation of a device as an object to be remotely controlled. When an error of such selection operation occurs, there is a disadvantage that a device different from the device intended by the user is remotely controlled.

The present invention has been made in view of such a background, and an object of the present invention is to provide a remote control device and a remote control system capable of performing remote control of an electronic device from a place distant to some extent, while preventing erroneous selection of the device.

SUMMARY OF THE INVENTION

An aspect of a remote control device for attaining the aforementioned object is a remote control device including: an operation instruction inputting part that inputs an operation instruction to an electronic device registered in advance as an object to be remotely controlled; and a control instruction transmitting part that transmits a control instruction based on the operation instruction to a selected electronic device, the selected electronic device being the electronic device selected as the object to be remotely controlled in the operation instruction, the remote control device further including: a same kind device determining part that determines whether or not a plurality of the electronic devices of the same kind as the selected electronic device exist; a distance determining part that determines whether or not a distance between the selected electronic device and the remote control device is equal to or larger than a predetermined distance threshold value; and a confirmation information notifying part that notifies confirmation information for transmission of the control instruction before the transmission of the control instruction by the control instruction transmitting part, in a case where when the operation instruction is input by the operation instruction inputting part, the same kind device determining part determines that a plurality of the electronic devices of the same kind as the selected electronic device exist, and the distance determining part determines that the distance between the selected electronic device and the remote control device is equal to or larger than the distance threshold value.

Another aspect of the remote control device for attaining the aforementioned object is a remote control device including: an operation instruction inputting part that inputs an operation instruction to an electronic device registered in advance as an object to be remotely controlled; and a control instruction transmitting part that transmits a control instruction based on the operation instruction to a selected electronic device, the selected electronic device being the electronic device selected as the object to be remotely controlled in the operation instruction, the remote control device further including: a same kind device determining part that determines whether or not a plurality of the electronic devices of the same kind as the selected electronic device exist; a distance determining part that determines whether or not the selected electronic device is the electronic device that is the nearest from the remote control device among the electronic devices of the same kind as the selected electronic device, when the same kind device determining part determines that a plurality of the electronic devices of the same kind as the selected electronic device exist; and a confirmation information notifying part that notifies confirmation information for transmission of the control instruction before the transmission of the control instruction by the control instruction transmitting part, in a case where when the operation instruction is input by the operation instruction inputting part, the same kind device determining part determines that a plurality of the electronic devices of the same kind as the selected electronic device exist, and the distance determining part does not determine that the selected electronic device is the electronic device that is the nearest from the remote control device among the electronic devices of the same kind as the selected electronic device.

Further another aspect of the remote control device for attaining the aforementioned object is a remote control device including: an operation instruction inputting part that inputs an operation instruction to an electronic device registered in advance as an object to be remotely controlled; and a control instruction transmitting part that transmits a control instruction based on the operation instruction to a selected electronic device, the selected electronic device being the electronic device selected as the object to be remotely controlled in the operation instruction, the remote control device further including: a distance determining part that determines whether or not a distance between the selected electronic device and the remote control device is equal to or larger than a predetermined distance threshold value; and a confirmation information notifying part that notifies confirmation information for transmission of the control instruction before the transmission of the control instruction by the control instruction transmitting part, in a case where when the operation instruction is input by the operation instruction inputting part, the distance determining part determines that the distance between the selected electronic device and the remote control device is equal to or larger than the distance threshold value.

In the aforementioned remote control device, the control instruction transmitting part may transmit the control instruction, in a case where when the confirmation information notifying part notifies the confirmation information, the operation instruction inputting part inputs an instruction to determine the operation instruction to the selected electronic device, in accordance with the notification of the confirmation information.

In the aforementioned remote control device, the operation instruction inputting part may input the operation instruction by voice.

An aspect of a remote control system for attaining the aforementioned object is a remote control system including: an electronic device registered in advance as an object to be remotely controlled; a remote control device; and a relay server that performs communication between the electronic device and the remote control device, wherein remote control of the electronic device by the remote control device is performed through the relay server, the remote control device has: an operation instruction inputting part that inputs an operation instruction to the electronic device; an operation instruction transmitting part that transmits the operation instruction to the relay server; a current position recognizing part that recognizes a current position of the remote control device; a current position information transmitting part that transmits, to the relay server, current position information indicating a current position of the remote control device recognized by the current position recognizing part; and a confirmation information notifying part that notifies confirmation information when receiving, from the relay server, the confirmation information for transmission of a control instruction to the electronic device based on the operation instruction, and the relay server has: an electronic device registration information acquiring part that acquires electronic device registration information including a placement position of the electronic device; a control instruction transmitting part that transmits the control instruction based on the operation instruction to a selected electronic device which is the electronic device selected as the object to be remotely controlled in the operation instruction, when the operation instruction is received from the remote control device; a same kind device determining part that determines whether or not a plurality of the electronic devices of the same kind as the selected electronic device exist; a distance determining part that determines whether or not a distance between the selected electronic device and the remote control device is equal to or larger than a predetermined distance threshold value, with reference to the current position information and the electronic device registration information; and a confirmation information transmitting part that transmits the confirmation information to the remote control device before the transmission of the control instruction by the control instruction transmitting part, in a case where when the operation instruction is received from the remote control device, the same kind device determining part determines that a plurality of the electronic devices of the same kind as the selected electronic device exist, and the distance determining part determines that the distance between the selected electronic device and the remote control device is equal to or larger than the distance threshold value.

Another aspect of the remote control system for attaining the aforementioned object is a remote control system including: an electronic device registered in advance as an object to be remotely controlled; a remote control device; and a relay server that performs communication between the electronic device and the remote control device, wherein remote control of the electronic device by the remote control device is performed through the relay server, the remote control device has: an operation instruction inputting part that inputs an operation instruction to the electronic device; an operation instruction transmitting part that transmits the operation instruction to the relay server; a current position recognizing part that recognizes a current position of the remote control device; a current position information transmitting part that transmits, to the relay server, current position information indicating a current position of the remote control device recognized by the current position recognizing part; and a confirmation information notifying part that notifies confirmation information when receiving, from the relay server, the confirmation information for transmission of a control instruction to the electronic device based on the operation instruction, and the relay server has: an electronic device registration information acquiring part that acquires electronic device registration information including a placement position of the electronic device; a control instruction transmitting part that transmits the control instruction based on the operation instruction to a selected electronic device which is the electronic device selected as the object to be remotely controlled in the operation instruction, when the operation instruction is received from the remote control device; a same kind device determining part that determines whether or not a plurality of the electronic devices of the same kind as the selected electronic device exist; a distance determining part that determines whether or not the selected electronic device is the electronic device that is the nearest from the remote control device among the electronic devices of the same kind as the selected electronic device, with reference to the current position information and the electronic device registration information, when the same kind device determining part determines that a plurality of the electronic devices of the same kind as the selected electronic device exist; and a confirmation information transmitting part that transmits the confirmation information for transmission of the control instruction to the remote control device before the transmission of the control instruction by the control instruction transmitting part, in a case where when the operation instruction is received from the remote control device, the same kind device determining part determines that a plurality of the electronic devices of the same kind as the selected electronic device exist, and the distance determining part does not determine that the selected electronic device is the electronic device that is the nearest from the remote control device among the electronic devices of the same kind as the selected electronic device.

Further another aspect of the remote control system for attaining the aforementioned object is a remote control system including: an electronic device registered in advance as an object to be remotely controlled; a remote control device; and a relay server that performs communication between the electronic device and the remote control device, wherein remote control of the electronic device by the remote control device is performed through the relay server, the remote control device has: an operation instruction inputting part that inputs an operation instruction to the electronic device; an operation instruction transmitting part that transmits the operation instruction to the relay server; a current position recognizing part that recognizes a current position of the remote control device; a current position information transmitting part that transmits, to the relay server, current position information indicating a current position of the remote control device recognized by the current position recognizing part; and a confirmation information notifying part that notifies confirmation information when receiving, from the relay server, the confirmation information for transmission of a control instruction to the electronic device based on the operation instruction, and the relay server has: an electronic device registration information acquiring part that acquires electronic device registration information including a placement position of the electronic device; a control instruction transmitting part that transmits the control instruction based on the operation instruction to a selected electronic device which is the electronic device selected as the object to be remotely controlled in the operation instruction, when the operation instruction is received from the remote control device; a distance determining part that determines whether or not a distance between the selected electronic device and the remote control device is equal to or larger than a predetermined distance threshold value, with reference to the current position information and the electronic device registration information; and a confirmation information transmitting part that transmits the confirmation information to the remote control device before the transmission of the control instruction by the control instruction transmitting part, in a case where when the operation instruction is received from the remote control device, the distance determining part determines that the distance between the selected electronic device and the remote control device is equal to or larger than the distance threshold value.

According to the aforementioned remote control device and remote control system, when an operation instruction to the electronic device separated from the remote control device by the predetermined distance or more, or the electronic device other than the electronic device which is the nearest to the remote control device is input among the electronic devices registered in advance as the object to be remotely controlled, confirmation information for transmission of the control instruction in accordance with the operation instruction is notified. Then, the object to be remotely controlled, which is intended by a user, is confirmed by this notification, and then the control instruction can be transmitted to the electronic device as the object. Therefore, the remote control of the electronic device from a place separated to some extent can be performed while preventing erroneous selection of the electronic device.

BRIEF DESCRIPTION OF THE DRAWINGS

FIG. 3 is an explanatory diagram of electronic device registration information;

FIG. 9 is an explanatory diagram of electronic device name information;

FIG. 11 is an explanatory diagram of electronic device registration information;

DETAILED DESCRIPTION OF THE PREFERRED EMBODIMENTS

1. Mode of Remote Control in First Embodiment

Figure 1:
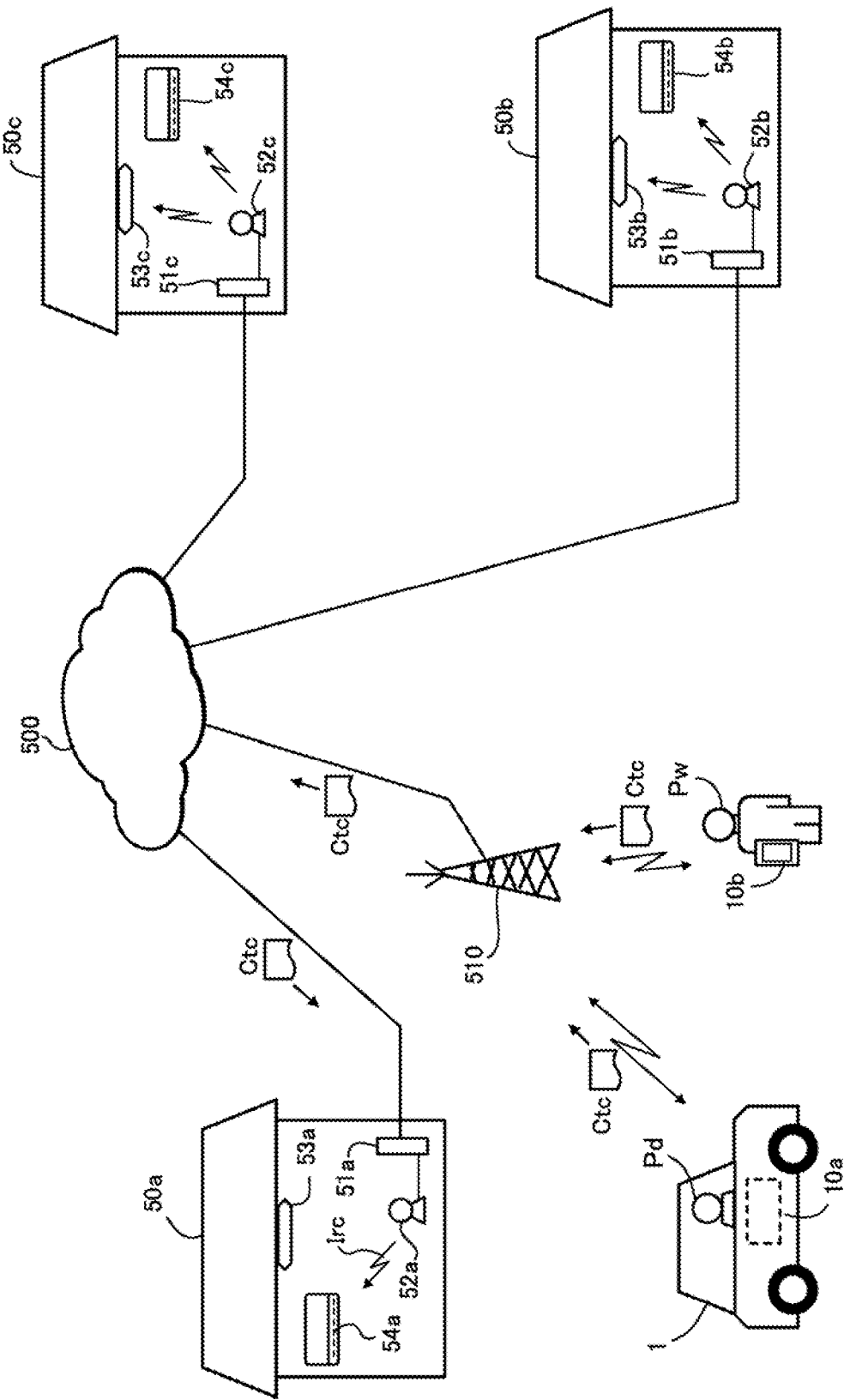
FIG. 1 is an explanatory diagram of remote control according to a first embodiment.

First, a first embodiment for remotely controlling an electronic device will be described with reference to FIG. 1 to FIG. 7. With reference to FIG. 1, in the first embodiment, electronic devices disposed in buildings 50a to 50c are remotely controlled by remote control devices 10a, 10b. In FIG. 1, as electronic devices, air conditioners 54a, 54b, 54c, and lighting devices 53a, 53b, 53c are illustrated.

In the building 50a, a wireless router 51a connected to a communication network 500 is disposed, and the wireless router 51a is connected to a household electric appliance controller 52a. The household electric appliance controller 52a outputs an infrared signal to each of the lighting device 53a and the air conditioner 54a, so that the household electric appliance controller 52a performs operation such as ON/OFF of a power source and change of illuminance for the lighting device 53a. Additionally, the household electric appliance controller 52a performs operation such as ON/OFF of a power source, change of an air conditioning mode (such as cooling, heating, and dehumidifying), and change of a preset temperature for the air conditioner 54a.

The infrared signal output to the lighting device 53a by the household electric appliance controller 52a is a signal conformed to an infrared remote controller attached to the lighting device 53a. The infrared signal output to the air conditioner 54a by the household electric appliance controller 52a is a signal conformed to an infrared remote controller attached to the air conditioner 54a. Similarly, in the buildings 50b, 50c, the lighting devices 53b, 53c and the air conditioners 54b, 54c are remotely controlled by the household electric appliance controllers 52b, 52c, respectively.

The remote control device 10a is installed in a vehicle 1, and operated by a user Pd who is a crew of the vehicle 1. The remote control device 10a may be an exclusive machine, or may be configured as a portion of a function of a vehicle onboard device such as a car navigation device, or a portion of a function of a portable communication terminal. The remote control device 10b is operated by a user Pw who is a pedestrian. The remote control device 10b may be an exclusive machine, or may be configured as a portion of a function of a smartphone, a tablet terminal, a cellular phone or the like owned by the user Pw.

Data of each of electronic devices registered in advance by the user Pd is stored in the remote control device 10a, and the user Pd instructs remote control to the registered electronic devices by voice input. Consequently, a control instruction Ctc is transmitted from the remote control device 10a to the electronic device selected by the voice input, and the remote control to the selected electronic device is performed. Similarly, data of each of electronic devices registered in advance by the user Pw is stored in the remote control device 10b, and the user Pw instructs remote control to the registered electronic devices by voice input.

FIG. 1 illustrates a case where the respective control instructions Ctc are transmitted to the lighting device 53a and the air conditioner 54a disposed in the building 50a, by the remote control devices 10a, 10b. When the household electric appliance controller 52a receives the control instruction Ctc, the household electric appliance controller 52a outputs an infrared signal Irc to each of the selected electronic devices 53a, 54a that are electronic devices designated in the control instructions Ctc. Consequently, remote control to the selected electronic devices 53a, 54a is performed. Similarly, in the buildings 50b, 50c, when the household electric appliance controllers 52b, 52c receive respective control instructions through wireless routers 51b, 51c, an infrared signal is output to each of the electronic devices selected in the control instructions.

2. Configuration of Remote Control Device in First Embodiment

A configuration of the remote control device in the first embodiment will be described with reference to FIG. 2 and FIG. 3. Configurations of the remote control devices 10a, 10b illustrated in FIG. 1 are similar, and therefore are hereinafter collectively referred to as a remote control device 10, and described. The wireless routers 51a to 51c illustrated in FIG. 1 are collectively referred to as a wireless router 51, and the household electric appliance controllers 52a to 52c are collectively referred to as a household electric appliance controller 52.

Figure 2:
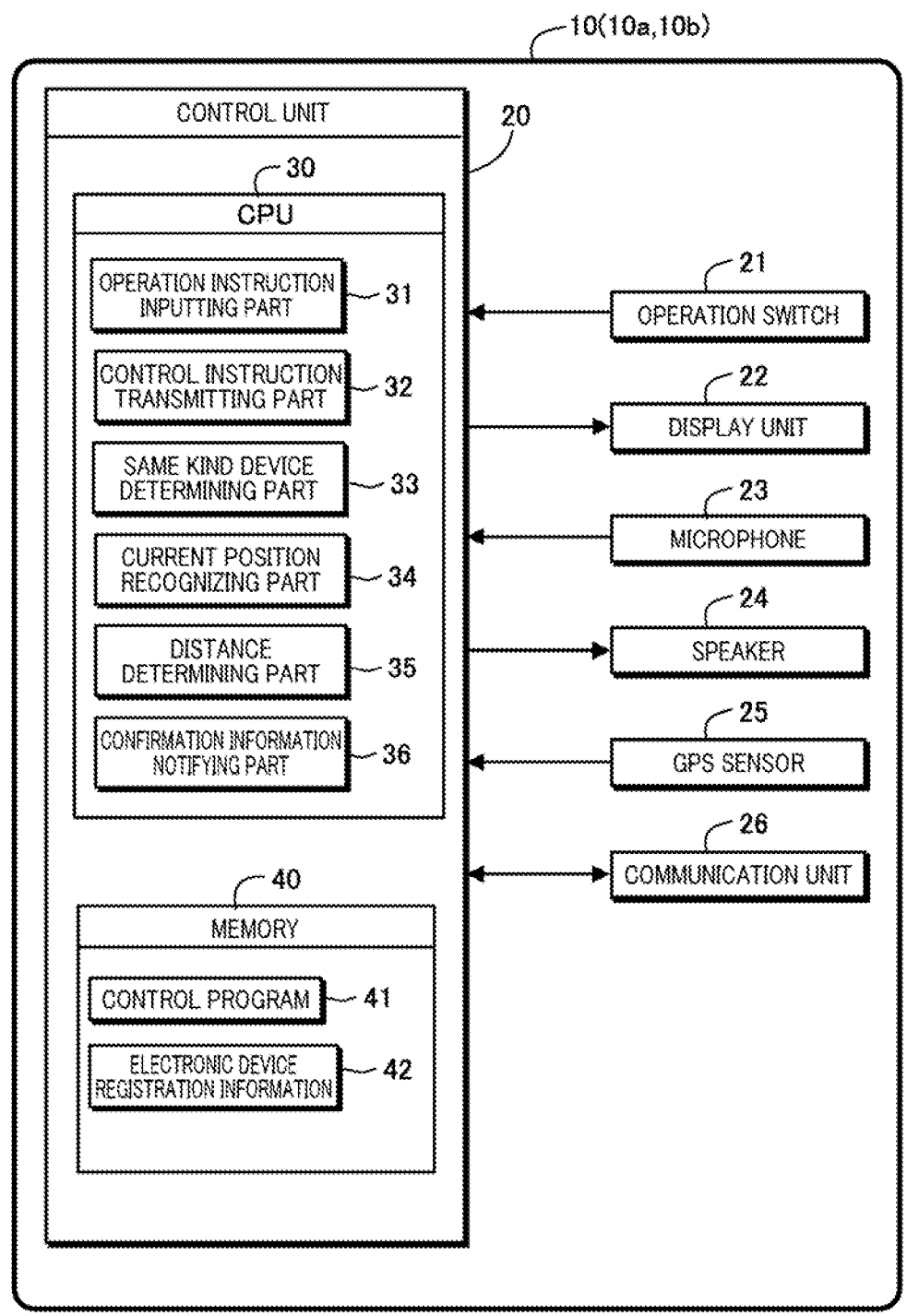
FIG. 2 is a configuration diagram of a remote control device according to the first embodiment.

As illustrated in FIG. 2, the remote control device 10 includes a control unit 20, an operation switch 21 connected to the control unit 20, a display unit 22, a microphone 23, a speaker 24, a GPS (Global Positioning System) sensor 25, and a communication unit 26. The GPS sensor 25 detects a current position (latitude and longitude) of the remote control device 10. The communication unit 26 performs communication through the communication network 500.

The control unit 20 includes a CPU (Central Processing Unit) 30, a memory 40, an interface circuit (not illustrated), and the like. A control program 41 for the remote control device 10, and electronic device registration information 42 are stored in the memory 40. Information of each electronic device registered by a user performing registration operation is recorded in the electronic device registration information 42.

With reference to FIG. 3, a registration No. denoted by reference numeral 42a, a kind of a device denoted by reference numeral 42b, a name of a device denoted by reference numeral 42c, a placement building denoted by reference numeral 42d, and a placement position denoted by reference numeral 42e of each registered electronic device are recorded in the electronic device registration information 42. Longitude and latitude are recorded as the placement position. For example, in registration No. "Ea-001", an air conditioner named "an air conditioner in a living room of own home" disposed in own home located at spot (La001, Lo001) is recorded.

The CPU 30 reads and executes the control program 41 to function as an operation instruction inputting part 31, a control instruction transmitting part 32, a same kind device determining part 33, a current position recognizing part 34, a distance determining part 35, and a confirmation information notifying part 36.

The operation instruction inputting part 31 recognizes voice of a user input from the microphone 23 to input an operation instruction to any of the electronic devices registered in the electronic device registration information 42. The control instruction transmitting part 32 transmits a control instruction for the selected electronic device to the household electric appliance controller 52 assigned the selected electronic device that is the electronic device selected in the operation instruction input by the operation instruction inputting part 31.

The same kind device determining part 33 determines whether or not a plurality of electronic devices of the same kind as the selected electronic device exist among the electronic devices registered in the electronic device registration information 42. The current position recognizing part 34 recognizes the current position of the remote control device 10 on the basis of position information (latitude and longitude) detected by the GPS sensor 25. The distance determining part 35 calculates a distance between the remote control device 10 and the selected electronic device on the basis of the current position of the remote control device 10 recognized by the current position recognizing part 34, and the placement position of the electronic device recorded in the electronic device registration information 42. Then, the distance determining part 35 determines whether or not the distance between the remote control device 10 and the selected electronic device satisfies the following distance determination conditions.

The distance determining part 35 determines whether or not any of the following first to third distance determination conditions is satisfied.

First Distance Determination Condition: A plurality of the electronic devices of the same kind as the selected electronic device exist among the electronic devices registered in the electronic device registration information 42, and the distance between the remote control device 10 and each selected electronic device is equal to or larger than a predetermined distance threshold value.

Second Distance Determination Condition: A plurality of the electronic devices of the same kind as the selected electronic device exist among the electronic devices registered in the electronic device registration information 42, and the selected electronic device is not an electronic device that is the nearest from the remote control device 10, among the electronic devices of the same kind as the selected electronic device.

Third Distance Determination Condition: The distance between the remote control device 10 and the selected electronic device is equal to or larger than a predetermined distance threshold value. The distance threshold value in the first distance determination condition, and the distance threshold value in the third distance determination condition may be set to the same value, or may be set to different values.

In a case where the distance determining part 35 determines that any of the aforementioned first distance determination condition to third distance determination condition is satisfied, the confirmation information notifying part 36 notifies confirmation information for confirming to a user whether or not a control instruction should be transmitted, before the control instruction transmitting part 32 transmits the control instruction to the selected electronic device. The confirmation information notifying part 36 outputs confirmation voice from the speaker 24 or displays a confirmation screen on the display unit 22 for notification of the confirmation information.

3. Remote Control Processes Using First Distance Determination Condition in First Embodiment In accordance with a flowchart illustrated in FIG. 4, a procedure of remote control processes using the first distance determination condition, performed by the remote control device 10 will be described.

Figure 4:
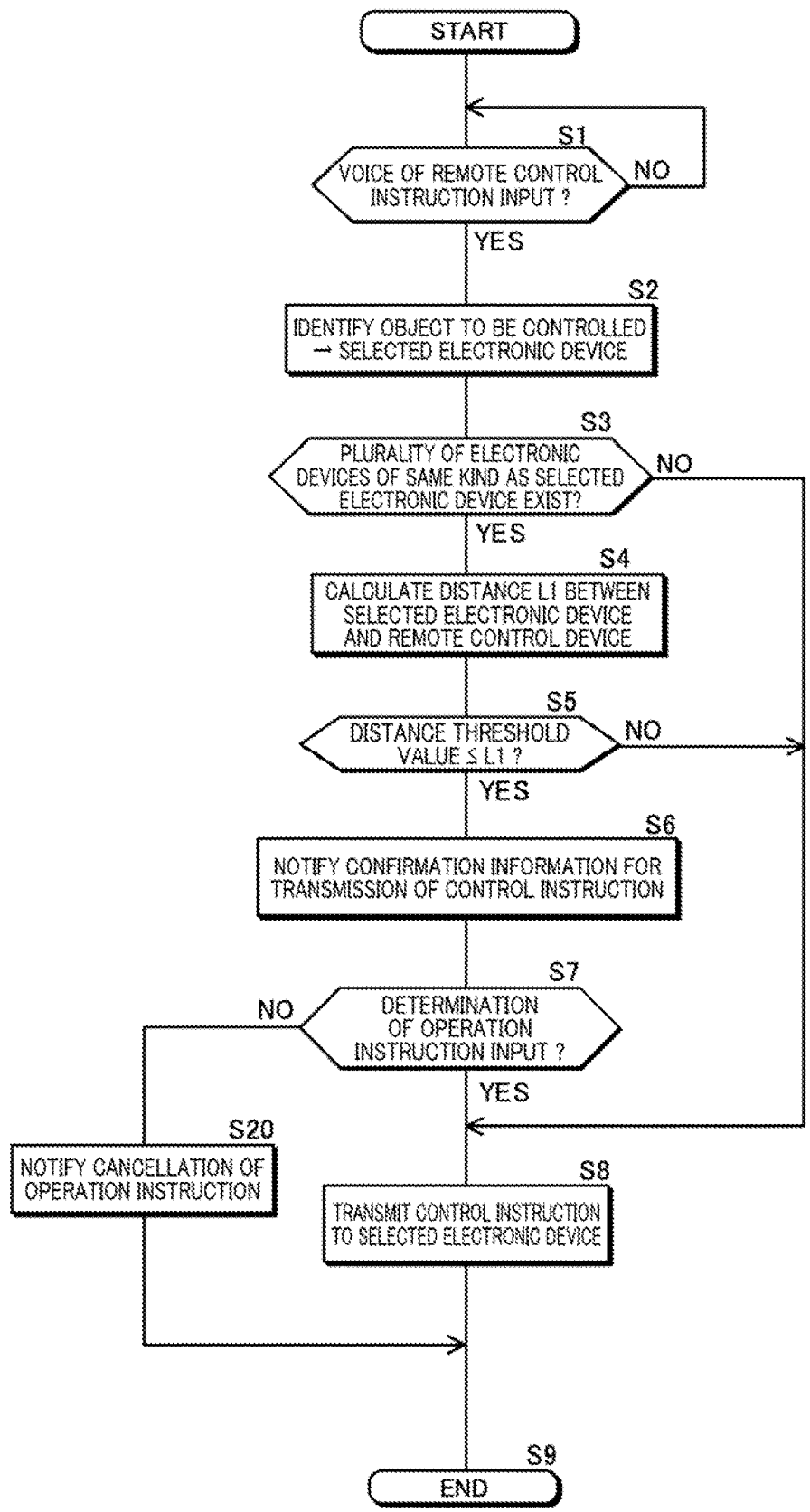
FIG. 4 is a flowchart of processes of remotely controlling an electronic device by the remote control device, by using a first distance determination condition.

In Step S1 of FIG. 4, when the operation instruction inputting part 31 inputs an operation instruction to the electronic device registered in the electronic device registration information 42 from an analysis result of user's voice input from the microphone 23, the operation instruction inputting part 31 advances the process to Step S2. In Step S2, the operation instruction inputting part 31 identifies an electronic device selected in the operation instruction as the selected electronic device.

In subsequent Step S3, the same kind device determining part 33 determines whether or not a plurality of electronic devices of the same kind as the selected electronic device exist among the electronic devices registered in the electronic device registration information 42, with reference to the electronic device registration information 42. Then, when the plurality of electronic devices of the same kind as the selected electronic device exist, the same kind device determining part 33 advances the process to Step S4. On the other hand, when the plurality of electronic devices of the same kind as the selected electronic device do not exist, the same kind device determining part 33 advances the process to Step S8.

In Step S8, the control instruction transmitting part 32 transmits a control instruction for instructing operation of the selected electronic device to the household electric appliance controller 52 assigned the selected electronic device, on the basis of the operation instruction. The household electric appliance controller 52 that receives the control instruction outputs a control signal by infrared light to the selected electronic device designated in the control instruction, so that remote control to the selected electronic device is implemented. For example, in a case where the selected electronic device is an air conditioner, and the control instruction is an instruction for instructing start of cooling operation, the selected electronic device starts cooling operation.

In Step S4, the distance determining part 35 calculates a distance L1 between the remote control device 10 and the selected electronic device on the basis of a current position of the remote control device 10 recognized by the current position recognizing part 34, and a placement position of the selected electronic device recorded in the electronic device registration information 42. In subsequent Step S5, the distance determining part 35 determines whether or not the distance L1 is equal to or larger than a distance threshold value. Then, when the distance L1 is equal to or larger than the distance threshold value, the distance determining part 35 advances the process to Step S6. When the distance L1 is less than the distance threshold value, the distance determining part 35 advances the process to Step S8.

Herein, a case where it is determined that the plurality of the electronic devices of the same kind as the selected electronic device exist in Step S3, and it is determined that the distance L1 between the remote control device 10 and the selected electronic device is equal to or larger than the distance threshold value in Step S5 is equivalent to a case where the aforementioned first distance determination condition is satisfied.

In Step S6, the confirmation information notifying part 36 outputs, from the speaker 24, voice for confirming whether or not the control instruction to the selected electronic device should be transmitted. As this voice, confirmation voice, for example, "an instruction to start cooling operation will be given an air conditioner in a living room of a summer house. Is this all right?" is output. Thus, the confirmation voice is output before the transmission of the control instruction, so that, for example, in a case where an air conditioner (registration No. Ea-001) of a living room of own home, and an air conditioner (registration No. Ea-011) of the living room of the summer house, which are electronic devices of the same kind, are similar name, and are likely to cause erroneous recognition by a voice instruction, exist as illustrated in FIG. 3, an electronic device different from the electronic device intended by the user can be prevented from being remotely controlled.

As an example of another registration name, in a case where the device name of the air conditioner disposed in own home of registration No. Ea-001 is registered as "air conditioner 1", and the device name of the air conditioner disposed in the summer house of registration No. Ea-011 is registered as "air conditioner 3", when the air conditioner in own home tries to be operated, the air conditioner in own home is registered not as the air conditioner 1 but as the air conditioner 3, which is wrongly remembered, and the air conditioner 3 is erroneously input by voice, the aforementioned confirmation voice is output, and therefore an electronic device different from the electronic device intended by the user can be prevented from being remotely controlled.

In subsequent Step S7, the control instruction transmitting part 32 determines whether or not the user inputs voice (for example, "yes, give the instruction" or the like) for confirming the transmission of the control signal to the selected electronic device. Then, when the voice is input, the control instruction transmitting part 32 advances the process to Step S8. When the voice is not input, the control instruction transmitting part 32 advances the process to Step S20. In Step S20, the control instruction transmitting part 32 outputs, from the speaker 24, voice (for example, "the operation instruction to the air conditioner in the living room of the summer house is cancelled") for notifying cancellation of the input of the operation instruction, and advances the process to Step S9. In this case, the control instruction to the selected electronic device is not transmitted.

Thus, in the processes in the flowchart of FIG. 4, in a case where the first distance determination condition is satisfied, the control instruction to the selected electronic device is transmitted in Step S8 subject to input for determining the operation instruction by the user in Step S7. Consequently, when the user erroneously selects the electronic device to be remotely controlled, the control instruction can be prevented from being transmitted to an electronic device different from the electronic device intended by the user. Then, in a case where such prevention is attained, and the user desires, the electronic device separated by the distance threshold value or more can be remotely controlled.

4. Remote Control Processes Using Second Distance Determination Condition in First Embodiment In accordance with a flowchart illustrated in FIG. 5, a procedure of performing remote control processes using the second distance determination condition, performed by the remote control device 10 will be described.

Figure 5:
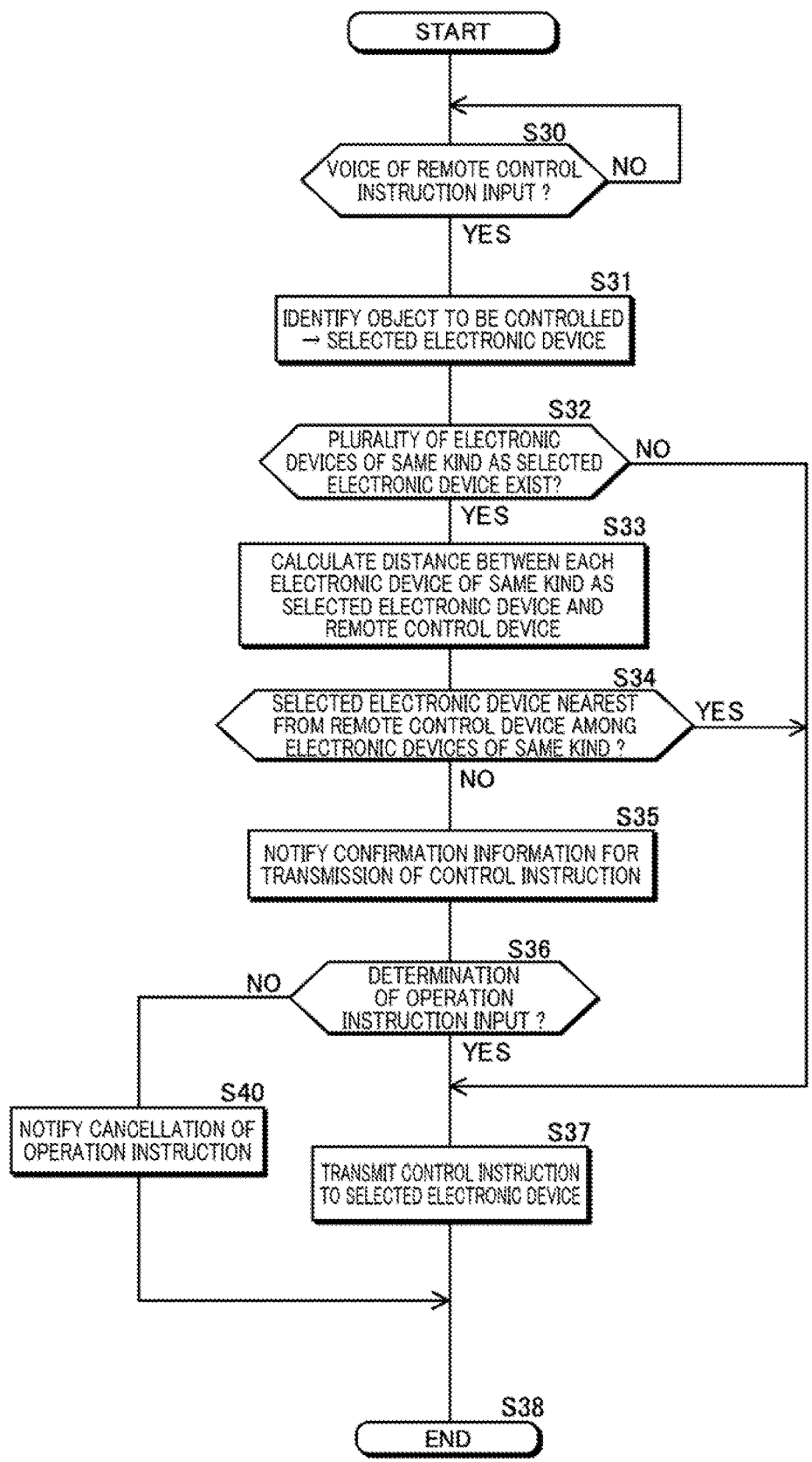
FIG. 5 is a flowchart of processes of remotely controlling the electronic device by the remote control device, by using a second distance determination condition.

In Step S30 of FIG. 5, when the operation instruction inputting part 31 inputs an operation instruction to the electronic device registered in the electronic device registration information 42 from an analysis result of user's voice input from the microphone 23, the operation instruction inputting part 31 advances the process to Step S31. In Step S31, the operation instruction inputting part 31 identifies an electronic device selected in the operation instruction as the selected electronic device.

In subsequent Step S32, the same kind device determining part 33 determines whether or not a plurality of electronic devices of the same kind as the selected electronic device exist among the electronic devices registered in the electronic device registration information 42, with reference to the electronic device registration information 42. Then, when the plurality of electronic devices of the same kind as the selected electronic device exist, the same kind device determining part 33 advances the process to Step S33. On the other hand, when the plurality of electronic devices of the same kind as the selected electronic device do not exist, the same kind device determining part 33 advances the process to Step S37.

In Step S37, the control instruction transmitting part 32 transmits a control instruction for instructing operation of the selected electronic device to the household electric appliance controller 52 assigned the selected electronic device, on the basis of the operation instruction. The household electric appliance controller 52 that receives the control instruction outputs a control signal by infrared light to the selected electronic device designated in the control instruction, so that remote control to the selected electronic device is implemented.

In Step S33, the distance determining part 35 calculates a distance between the remote control device 10 and each electronic device of the same kind as the selected electronic device by a current position of the remote control device 10 recognized by the current position recognizing part 34, and a placement position of the electronic device recorded in the electronic device registration information 42. In subsequent Step S34, the distance determining part 35 determines whether or not the selected electronic device is an electronic device that is the nearest from the remote control device 10, among the electronic devices of the same kind as the selected electronic device.

Then, when the selected electronic device is the electronic device that is the nearest from the remote control device 10, the distance determining part 35 advances the process to Step S37. When the selected electronic device is not the electronic device that is the nearest from the remote control device 10, the distance determining part 35 advances the process to Step S35. Herein, a case where it is determined that the plurality of the electronic devices of the same kind as the selected electronic device exist in Step S32, and it is determined that the selected electronic device is not the electronic device that is the nearest from the remote control device 10 in Step S34 is equivalent to a case where the aforementioned second distance determination condition is satisfied.

In Step S35, the confirmation information notifying part 36 outputs, from the speaker 24, voice for confirming whether or not the control instruction to the selected electronic device should be transmitted, similarly to the aforementioned Step S6 of FIG. 4. In subsequent Step S36, the control instruction transmitting part 32 determines whether or not the user inputs voice for confirming the transmission of the control instruction to the selected electronic device. Then, when the voice for confirming the transmission of the control instruction to the selected electronic device is input, the control instruction transmitting part 32 advances the process to Step S37. On the other hand, when the voice for confirming the transmission of the control instruction to the selected electronic device is not input, the control instruction transmitting part 32 advances the process to Step S40. In Step S40, the control instruction transmitting part 32 outputs, from the speaker 24, voice for notifying cancellation of the input of the operation instruction, and advances the process to Step S38. In this case, the control instruction to the selected electronic device is not transmitted.

Thus, in the processes in the flowchart of FIG. 5, in a case where the second distance determination condition is satisfied, the control instruction to the selected electronic device is transmitted in Step S37 subject to input for determining the operation instruction by the user in Step S36. Consequently, when the user erroneously selects the electronic device to be remotely controlled, the control instruction can be prevented from being transmitted to an electronic device of the same kind, the electronic device being different from the electronic device intended by the user. Then, in a case where such prevention is attained, and the user desires, the electronic device that is not the nearest from the remote control device 10 can be remotely controlled.

5. Remote Control Processes Using Third Distance Determination Condition in First Embodiment In accordance with a flowchart illustrated in FIG. 6, a procedure of remote control processes using the third distance determination condition, performed by the remote control device 10 will be described.

Figure 6:
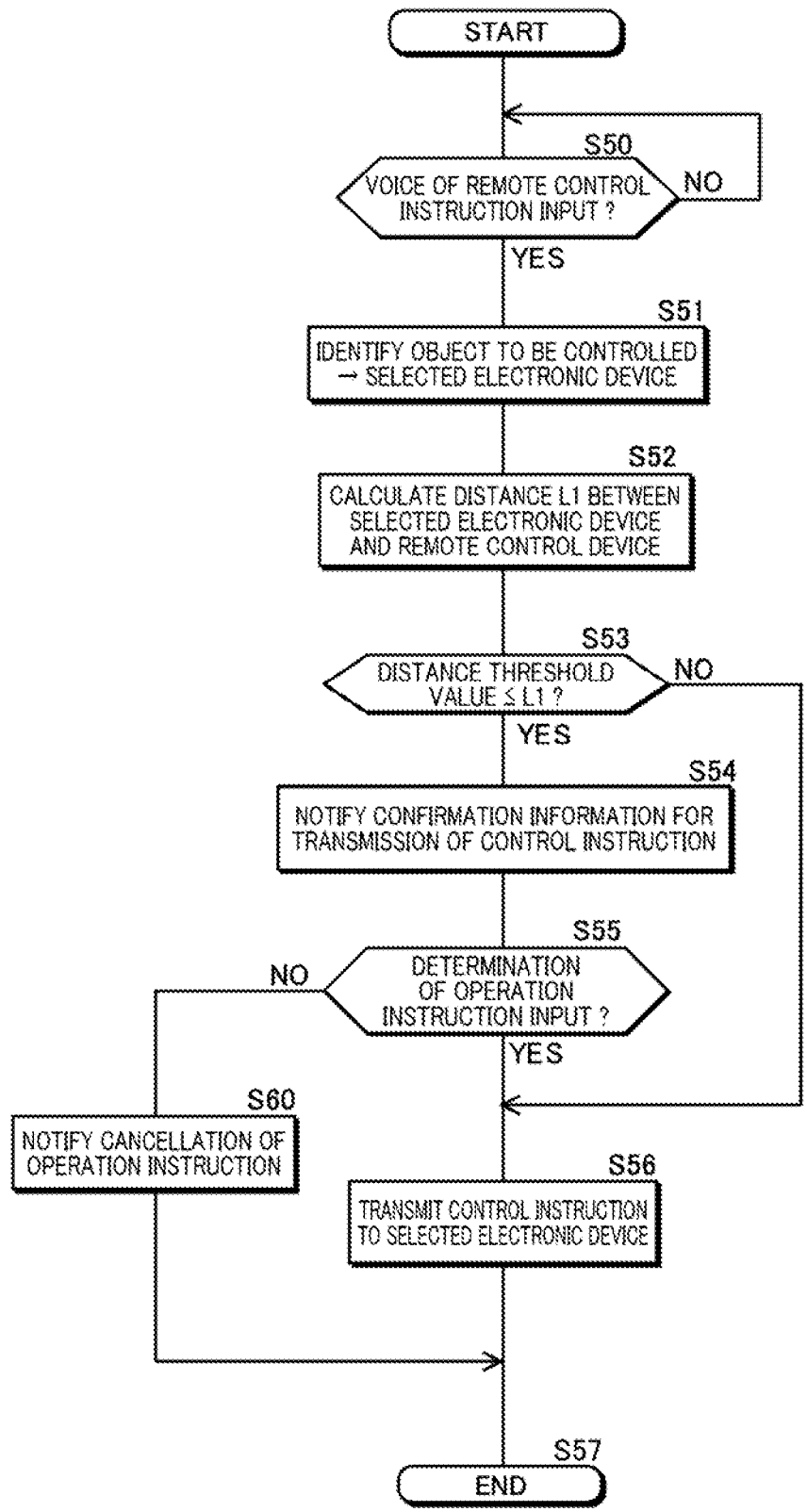
FIG. 6 is a flowchart of processes of remotely controlling the electronic device by the remote control device, by using a third distance determination condition.

In Step S50 of FIG. 6, when the operation instruction inputting part 31 inputs an operation instruction to the electronic device registered in the electronic device registration information 42 from an analysis result of user's voice input from the microphone 23, the operation instruction inputting part 31 advances the process to Step S51. In Step S51, the operation instruction inputting part 31 identifies an electronic device selected in the operation instruction as the selected electronic device.

In Step S52, the distance determining part 35 calculates a distance L1 between the remote control device 10 and the selected electronic device on the basis of a current position of the remote control device 10 detected by the current position recognizing part 34, and a placement position of the selected electronic device recorded in the electronic device registration information 42. In subsequent Step S53, the distance determining part 35 determines whether or not the distance L1 is equal to or larger than a distance threshold value.

Then, when the distance L1 is equal to or larger than the distance threshold value, the distance determining part 35 advances the process to Step S54. When the distance L1 is less than the distance threshold value, the distance determining part 35 advances the process to Step S56. In Step S56, the control instruction transmitting part 32 outputs a control signal by infrared light to the household electric appliance controller 52 assigned the selected electronic device, so that remote control to the selected electronic device is implemented.

Herein, a case where it is determined that the distance L1 between the remote control device 10 and the selected electronic device is equal to or larger than the distance threshold value in Step S53 is equivalent to a case where the aforementioned third distance determination condition is satisfied.

In Step S54, the confirmation information notifying part 36 outputs, from the speaker 24, voice for confirming whether or not the control instruction to the selected electronic device should be transmitted, similarly to the aforementioned Step S6 of FIG. 4. In subsequent Step S55, the control instruction transmitting part 32 determines whether or not the voice for determining the transmission of the control signal to the selected electronic device is input by the user, similarly to the aforementioned Step S7 of FIG. 4.

Then, when the voice for determining the transmission of the control signal to the selected electronic device is input, the control instruction transmitting part 32 advances the process to Step S56. When the voice for determining the transmission of the control signal to the selected electronic device is not input, the control instruction transmitting part 32 advances the process to Step S60. In Step S60, the control instruction transmitting part 32 notifies cancellation of the input of the operation instruction similarly to the aforementioned Step S20 of FIG. 4, and advances the process to Step S57.

Thus, in the processes in the flowchart of FIG. 6, in a case where the third distance determination condition is satisfied, the control instruction to the selected electronic device is transmitted in Step S56 subject to input for determining the operation instruction by the user in Step S55. Consequently, when the user erroneously selects the electronic device to be remotely controlled, the control instruction can be prevented from being transmitted to an electronic device that is different from the electronic device intended by the user. Then, in a case where such prevention is attained, and user desires, the electronic device that is separated by the distance threshold value or more can be remotely controlled.

6. Mode of Remote Control in Second Embodiment

Figure 7:
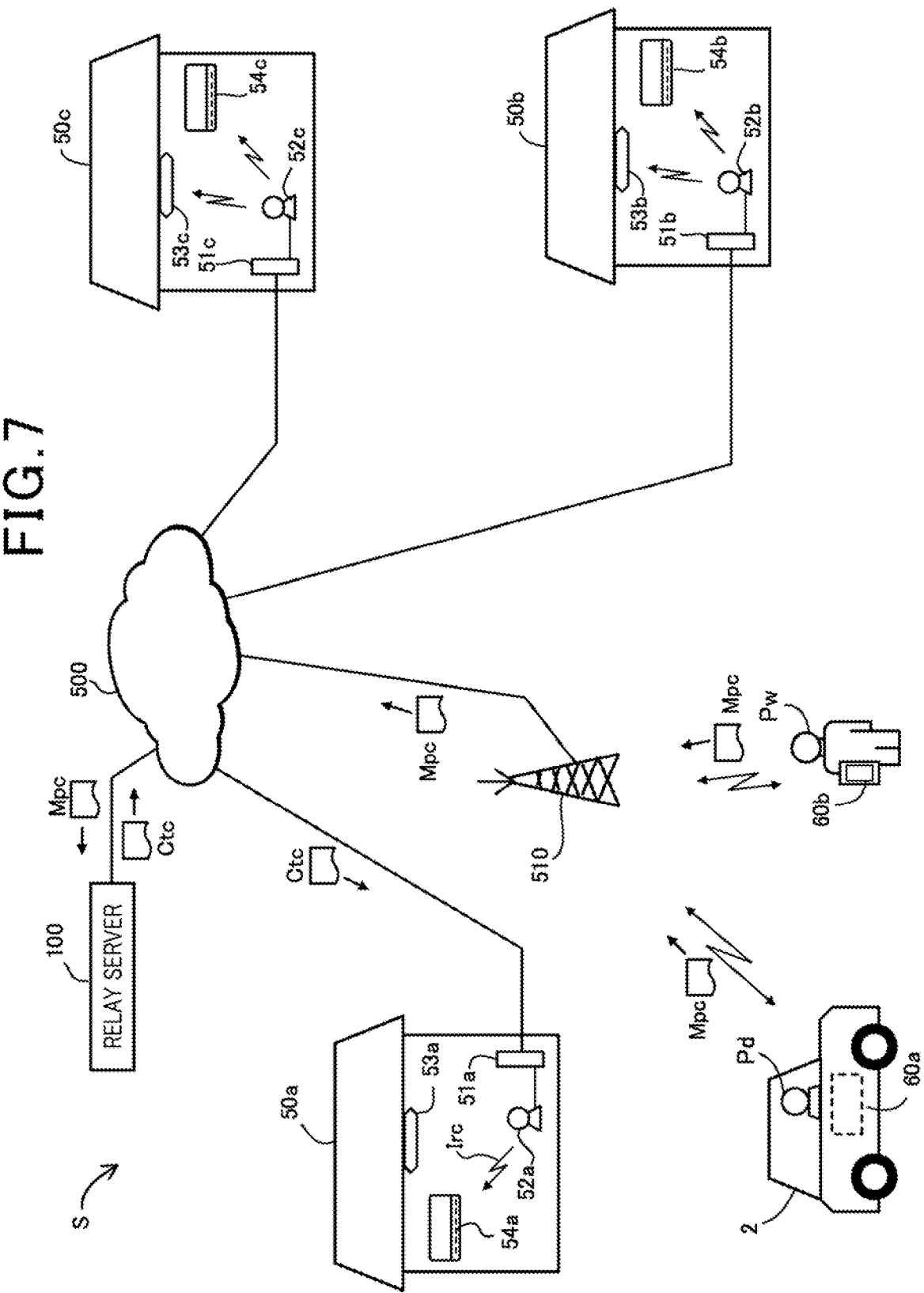
FIG. 7 is a configuration diagram of remote control according to a second embodiment.

Now, a second embodiment for remotely controlling electronic devices will be described with reference to FIG. 7 to FIG. 14. With reference to FIG. 7, in the second embodiment, electronic devices disposed in the buildings 50a to 50c are remotely controlled by a remote control system S including remote control devices 60a, 60b, a relay server 100, and electronic devices 53a to 53c, 54a to 54c disposed in buildings 50a to 50c. Herein, components identical to the components illustrated in FIG. 1 are denoted by the same reference numerals, and description thereof will be omitted.

The remote control device 60a is installed in a vehicle 2, and operated by a user Pd who is a crew of the vehicle 2. The remote control device 60a may be an exclusive machine, or may be configured as a portion of a function of a vehicle onboard device such as a car navigation device, or a portion of a function of a portable communication terminal. The remote control device 60b is operated by a user Pw who is a pedestrian. The remote control device 10b may be an exclusive machine, or may be configured as a portion of a function of a smartphone, a tablet terminal, a cellular phone or the like owned by the user Pw.

A name and a registration No. of each of electronic devices registered in advance by the user Pd, and an IP address of the relay server 100 are recorded in the remote control device 60a, and the user Pd instructs remote control to the name of the registered electronic device by voice input. In accordance with the instruction by this voice input, the remote control device 60a transmits an operation instruction for instructing remote control for the selected electronic device to the relay server 100. The relay server 100 transmits a control signal for the selected electronic device to any of the household electric appliance controllers 52a to 52c assigned the selected electronic device.

Similarly, a name and a registration No. of each of electronic devices registered in advance by the user Pw, and the IP address of the relay server 100 are recorded in the remote control device 60b, and the user Pw performs remote control to the registered electronic device by voice input of the name of the electronic device. Consequently, the user Pw can select any of the registered electronic devices to perform the remote control.

FIG. 7 illustrates a case where the air conditioner 54a and the lighting device 53a disposed in the own home 50a are used as the selected electronic devices, respective operation instructions Mpc are transmitted from the remote control devices 60a, 60b to the relay server 100, and a control instruction Ctc in accordance with the operation instructions Mpc is transmitted from the relay server 100 to the household electric appliance controller 52a. The household electric appliance controller 52a that receives the control instruction Ctc outputs an infrared signal Irc to the air conditioner 54a and the lighting device 53a. Consequently, remote control to the selected electronic devices 53a, 54a is implemented.

7. Configuration of Remote Control Device in Second Embodiment

Configurations of the remote control devices 60a, 60b in the second embodiment will be described with reference to FIG. 8 and FIG. 9. The configurations of the remote control devices 60a, 60b illustrated in FIG. 7 are similar, and therefore hereinafter collectively referred to as a remote control device 60. The wireless routers 51a to 51c illustrated in FIG. 7 are collectively referred to as a wireless router 51, and the household electric appliance controllers 52a to 52c are collectively referred to as a household electric appliance controller 52.

Figure 8:
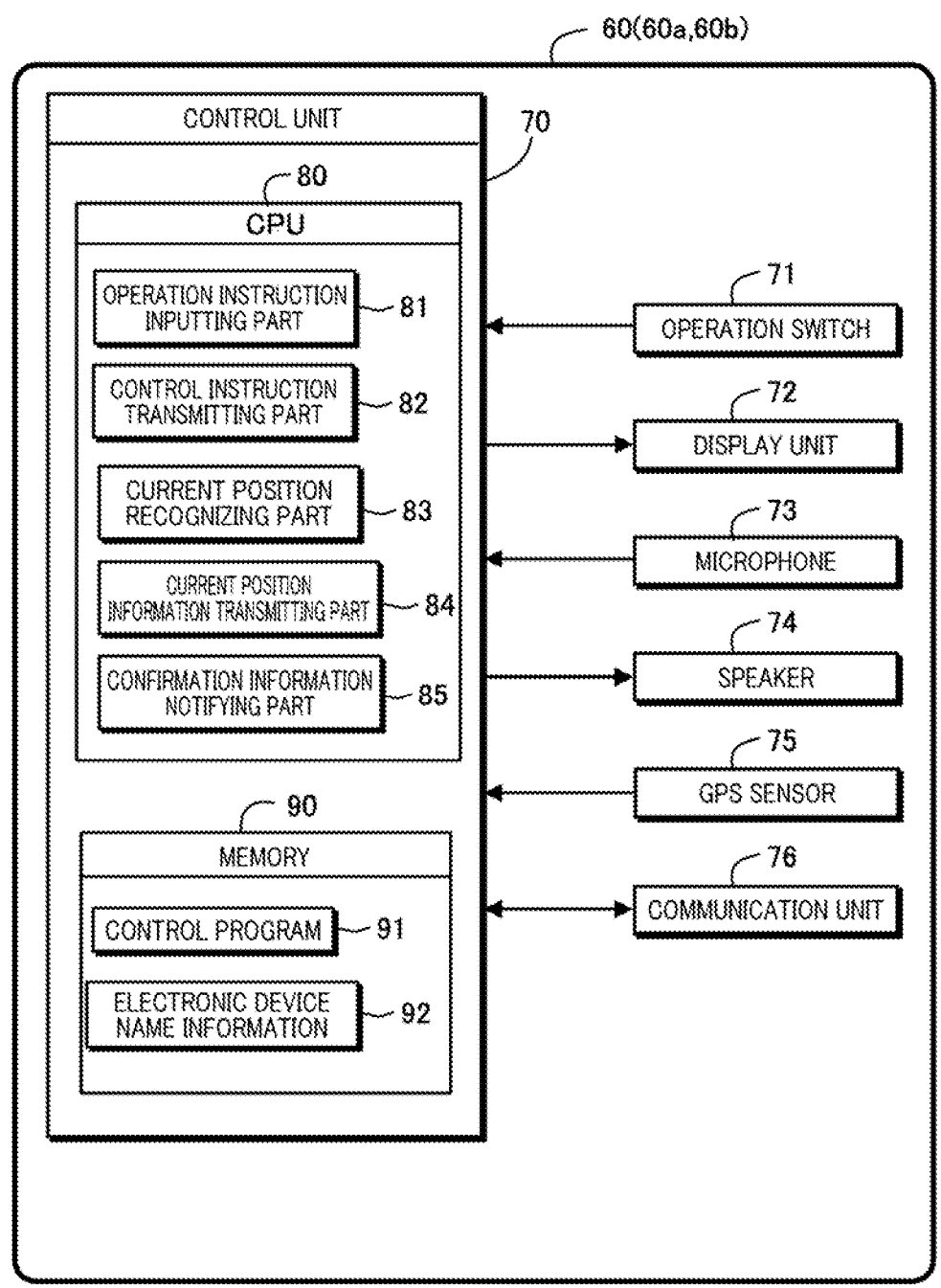
FIG. 8 is a configuration diagram of a remote control device according to the second embodiment.

As illustrated in FIG. 8, the remote control device 60 includes a control unit 70, an operation switch 71 connected to the control unit 70, a display unit 72, a microphone 73, a speaker 74, a GPS sensor 75, and a communication unit 76. The GPS sensor 75 detects a current position (latitude and longitude) of the remote control device 60. The communication unit 76 performs communication through the communication network 500.

The control unit 70 includes a CPU 80, a memory 90, an interface circuit (not illustrated), and the like. A control program 91 for the remote control device 60, and electronic device name information 92 are stored in the memory 90. As illustrated in FIG. 9, information of each electronic device registered by the user performing registration operation is recorded in the electronic device name information 92.

A registration No. denoted by reference numeral 92a, a kind of a device denoted by reference numeral 92b, a name of a device denoted by numeral 92c, a placement building denoted by reference numeral 92d, an IP address of the relay server 100 denoted by reference numeral 92e, and the like of each registered electronic device are recorded in the electronic device name information 92. For example, an air conditioner named an "air conditioner in a living room of own home" disposed in own home is recorded in registration No. "Ea-001".

The CPU 80 reads and executes the control program 91 to function as an operation instruction inputting part 81, an operation instruction transmitting part 82, a current position recognizing part 83, a current position information transmitting part 84, and a confirmation information notifying part 85.

The operation instruction inputting part 81 recognizes voice of a user input from the microphone 73 to input an operation instruction to any of the electronic devices registered by the electronic device name information 92. The operation instruction transmitting part 82 transmits, to the relay server 100, an operation instruction for the electronic device input by the operation instruction inputting part 81. The current position recognizing part 83 recognizes a current position of the remote control device 60 on the basis of position information (latitude and longitude) detected by the GPS sensor 75. The current position information transmitting part 84 transmits, to the relay server 100, current position information indicating a current position of the remote control device 60 recognized by the current position recognizing part 83.

When the confirmation information notifying part 85 receives, from the relay server 100, confirmation information for promoting confirmation of transmission of the control instruction for the electronic device selected in the operation instruction, the confirmation information notifying part 85 outputs, from the speaker 74, voice for notifying the confirmation information.

8. Configuration of Relay Server in Second Embodiment

Figure 10:
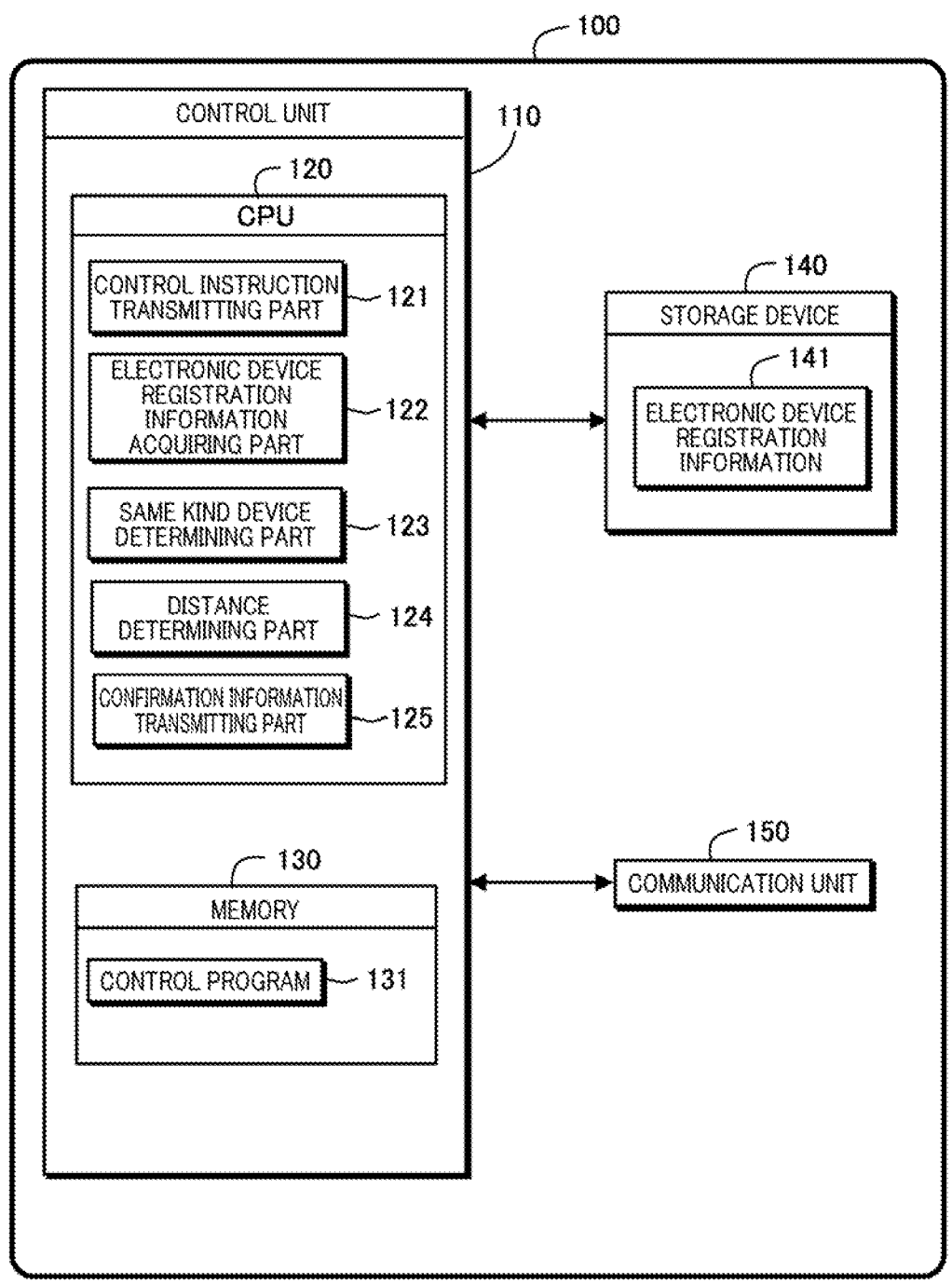
FIG. 10 is a configuration diagram of a relay server.

A configuration of the relay server 100 in the second embodiment will be described with reference to FIG. 10 and FIG. 11. As illustrated in FIG. 10, the relay server 100 is composed of a control unit 110, and a storage device 140 and a communication unit 150 connected to the control unit 110. The communication unit 150 performs communication through the communication network 500. The storage device 140 may be provided in another server different from the relay server 100, and the relay server 100 may communicate with another server to acquire information stored in the storage device 140.

Electronic device registration information 141 is stored in the storage device 140. As illustrated in FIG. 11, a registration No. denoted by reference numeral 141*a*, a kind of a device denoted by reference numeral 141*b*, a name of a device denoted by numeral 141*c*, a placement building denoted by reference numeral 141*d*, a placement position (latitude and longitude) denoted by reference numeral 141*e*, and an IP address of the household electric appliance controller (household electric appliance controllers 52*a* to 52*c* in FIG. 7) denoted by reference numeral 141*f* of each electronic device registered by the relay server 100 are recorded in the electronic device registration information 141. For example, as to an air conditioner named an "air conditioner in a living room of own home" disposed in own home, a placement position (La001, Lo001), and an IP address (HcIP-001) of an associated household electric appliance controller are recorded in registration No. "Ea-001".

The control unit 110 includes a CPU 120 and a memory 130. The CPU 120 reads and executes the control program of the relay server 100 stored in the memory 130 to function as a control instruction transmitting part 121, an electronic device registration information acquiring part 122, a same kind device determining part 123, a distance determining part 124, and a confirmation information transmitting part 125. The control instruction transmitting part 121 transmits a control instruction for the selected electronic device to the household electric appliance controller assigned the selected electronic device that is the electronic device selected in the operation instruction received from the remote control device 60.

The electronic device registration information acquiring part 122 accesses the storage device 140 to acquire the electronic device registration information 141. In a case where the electronic device registration information 141 is stored in another server different from the relay server 100, the electronic device registration information acquiring part 122 acquires the electronic device registration information 141 by accessing another server through the communication unit 150.

The same kind device determining part 123 determines whether or not a plurality of electronic devices of the same kind as the selected electronic device exist among the electronic devices registered in the electronic device registration information 141. The distance determining part 124 calculates a distance between the remote control device 60 and the selected electronic device on the basis of the current position information received from the remote control device 60, and the placement position of the electronic device recorded in the electronic device registration information 141. Then, the distance determining part 124 determines which of the aforementioned first to third distance determination conditions is satisfied, similarly to the distance determining part 35 of the aforementioned first embodiment.

In a case where the distance determining part 124 determines that any of the aforementioned first to third distance determination conditions is satisfied, the confirmation information transmitting part 125 transmits, to the remote control device 60, confirmation information for confirming a user whether or not a control instruction should be transmitted, before the control instruction transmitting part 121 transmits the control instruction to the selected electronic device.

9. Remote Control Processes Using First Distance Determination Condition in Second Embodiment In accordance with a flowchart illustrated in FIG. 12, a procedure of remote control processes using the first distance determination condition, performed by the remote control system S will be described.

Figure 12:
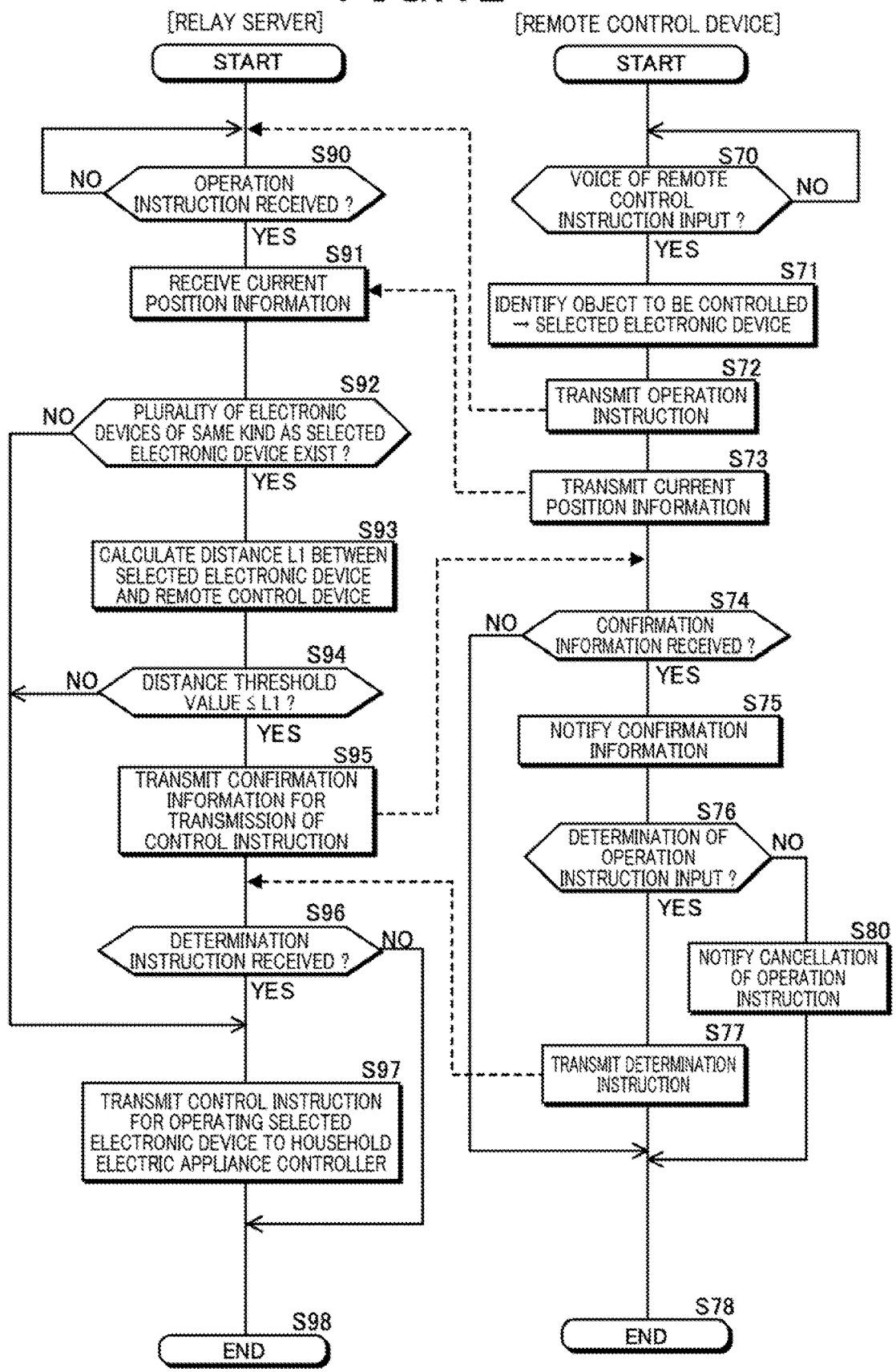
FIG. 12 is a flowchart of processes of remotely controlling the electronic device by a remote control system, by using the first distance determination condition.

In Step S70 of FIG. 12, when the operation instruction inputting part 81 of the remote control device 60 inputs an operation instruction to the electronic device recorded in the electronic device name information 92 from an analysis result of user's voice input from the microphone 73, the operation instruction inputting part 81 advances the process to Step S71. In Step S71, the operation instruction inputting part 81 identifies an electronic device selected in the operation instruction as the selected electronic device.

In subsequent Step S72, the operation instruction transmitting part 82 transmits the operation instruction to the relay server 100. In subsequent Step S73, the current position information transmitting part 84 transmits, to the relay server 100, the current position information indicating a current position of the remote control device 60 recognized by the current position recognizing part 83.

When the same kind device determining part 123 of the relay server 100 receives the operation instruction from the remote control device 60 in Step S90, the same kind device determining part 123 of the relay server 100 advances the process to Step S91, and receives the current position information from the remote control device 60. In subsequent Step S92, the same kind device determining part 123 determines whether or not a plurality of electronic devices of the same kind as the selected electronic device exist, with reference to the electronic device registration information 141.

Then, when the plurality of electronic devices of the same kind as the selected electronic device exist, the same kind device determining part 123 advances the process to Step S93. When the plurality of electronic devices of the same kind as the selected electronic device do not exist, the same kind device determining part 123 advances the process to Step S97. In Step S97, the control instruction transmitting part 121 transmits a control instruction for instructing output of the control signal for the selected electronic device to the household electric appliance controller 52 assigned the selected electronic device. The household electric appliance controller 52 that receives the control instruction outputs a control signal by infrared light to the selected electronic device. Consequently, remote control to the selected electronic device is implemented.

In Step S93, the distance determining part 124 calculates a distance L1 between the remote control device 60 and the selected electronic device with reference to the current position information received in Step S91, and the placement position of the electronic device recorded in the electronic device registration information 141. In subsequent Step S94, the distance determining part 124 determines whether or not the distance L1 is equal to or larger than the distance threshold value. Then, when the distance L1 is equal to or larger than the distance threshold value, the distance determining part 124 advances the process to Step S95. Additionally, when the distance L1 is less than the distance threshold value, the distance determining part 124 advances the process to Step S97.

Herein, a case where it is determined that the plurality of the electronic devices of the same kind as the selected electronic device exist in Step S92, and it is determined that the distance L1 between the remote control device 60 and the selected electronic device is equal to or larger than the distance threshold value in Step S94 is equivalent to a case where the aforementioned first distance determination condition is satisfied. In Step S95, the confirmation information transmitting part 125 transmits, to the remote control device 60, confirmation information for confirming whether or not a control instruction to the selected electronic device should be transmitted.

The confirmation information notifying part 85 of the remote control device 60 determines whether or not the confirmation information is received from the relay server 100 in Step S74. Then, when the confirmation information notifying part 85 receives the confirmation information from the relay server 100, the confirmation information notifying part 85 advances the process to Step S75. Additionally, when the confirmation information notifying part 85 does not receive the confirmation information from the relay server 100, the confirmation information notifying part 85 advances the process to Step S78.

In Step S75, the confirmation information notifying part 85 outputs, from the speaker 74, voice for confirming whether or not the control instruction to the selected electronic device should be transmitted, similarly to the aforementioned Step S6 of FIG. 4. In subsequent Step S76, the confirmation information notifying part 85 determines whether or not confirmation of the operation instruction is input by a user. Then, when the confirmation of the operation instruction is input, the confirmation information notifying part 85 advances the process to Step S77. Additionally, when the confirmation of the operation instruction is not input, the confirmation information notifying part 85 advances the process to Step S80.

In Step S80, the confirmation information notifying part 85 outputs, from the speaker 74, voice for notifying cancellation of the instruction of remote control to the selected electronic device. In Step S77, the confirmation information notifying part 85 transmits a confirmation instruction to the relay server 100.

The control instruction transmitting part 121 of the relay server 100 determines whether or not the confirmation instruction is received from the remote control device 60 in Step S96. Then, when the confirmation instruction is received from the remote control device 60, the control instruction transmitting part 121 advances the process to Step S96. On the other hand, when the confirmation instruction is not received from the remote control device 60, the control instruction transmitting part 121 advances the process from Step S96 to Step S98. In this case, the control instruction to the selected electronic device is not transmitted.

Thus, in a case where the first distance determination condition is satisfied, an approval instruction by the user is input in Step S76, the selected electronic device is remotely controlled subject to transmission of the confirmation instruction from the remote control device 60 to the relay server 100. Consequently, when the user erroneously selects the electronic device to be remotely controlled, the control instruction can be prevented from being transmitted to an electronic device different from the electronic device intended by the user. Then, in a case where such prevention is attained, and the user desires, the electronic device separated by the distance threshold value or more can be remotely controlled.

10. Remote Control Processes Using Second Distance Determination Condition in Second Embodiment In accordance with a flowchart illustrated in FIG. 13, a procedure of remote control processes using the second distance determination condition, performed by the remote control device 60 and the relay server 100 will be described.

Figure 13:
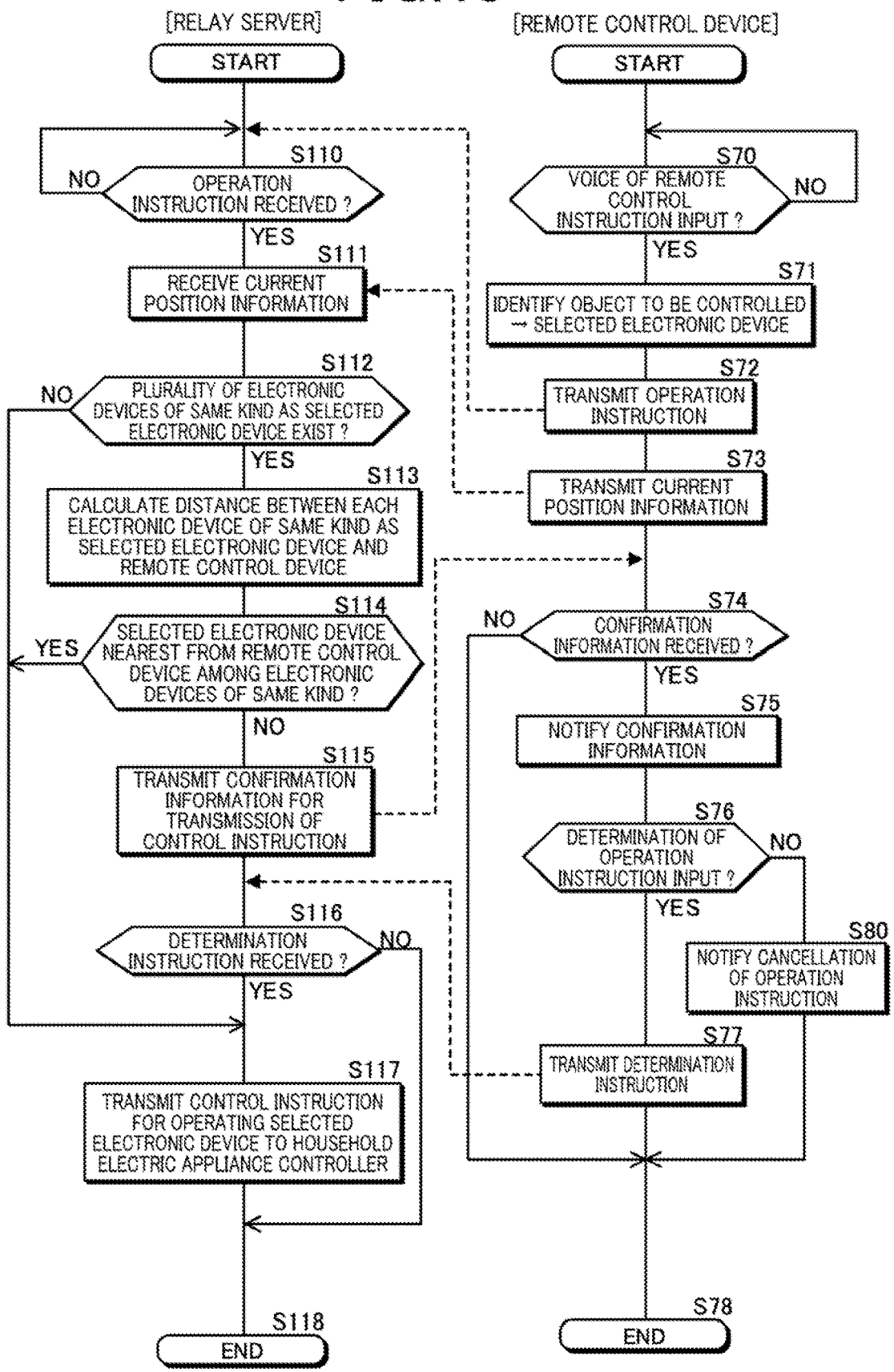
FIG. 13 is a flowchart of processes of remotely controlling the electronic device by the remote control system, by using the second distance determination condition.

Processes by the remote control device 60, indicated in Step S70 to S77, and S80 of FIG. 13 are similar to those of FIG. 12, and therefore detailed description will be omitted. When the same kind device determining part 123 of the relay server 100 receives an operation instruction from the remote control device 60 in Step S110, the same kind device determining part 123 advances the process to Step S111. In Step S111, the same kind device determining part 123 receives, from the remote control device 60, the current position information indicating the current position of the remote control device 60.

In subsequent Step S112, the same kind device determining part 123 determines whether or not a plurality of electronic devices of the same kind as the electronic device selected in the operation instruction exist, with reference to the electronic device registration information 141. Then, when the plurality of electronic devices of the same kind as the selected electronic device exist, the same kind device determining part 123 advances the process to Step S113. Additionally, when the plurality of electronic devices of the same kind as the selected electronic device do not exist, the same kind device determining part 123 advances the process to Step S117.

In Step S117, the control instruction transmitting part 121 transmits a control instruction for instructing remote control for the selected electronic device to the household electric appliance controller 52 assigned the selected electronic device. The household electric appliance controller 52 that receives the control instruction outputs a control signal by an infrared signal to the selected electronic device. Consequently, remote control to the selected electronic device is implemented.

In Step S113, the distance determining part 124 calculates a distance between each electronic device of the same kind as the selected electronic device and the remote control device with reference to the current position information received in Step S111, and the electronic device registration information 141 acquired by the electronic device registration information acquiring part 122. In subsequent Step S114, the distance determining part 124 determines whether or not the selected electronic device is an electronic device that is the nearest from the remote control device 60, among the electronic devices of the same kind as the selected electronic device. Then, when the selected electronic device is the electronic device that is the nearest from the remote control device 60, the distance determining part 124 advances the process to Step S117. When the selected electronic device is not the electronic device that is the nearest from the remote control device 60, the distance determining part 124 advances the process to Step S115.

Herein, a case where it is determined that the plurality of the electronic devices of the same kind as the selected electronic device exist in Step S112, and it is determined that the selected electronic device is not the electronic device that is the nearest from the remote control device 60 among the electronic devices of the same kind as the selected electronic device in Step S114 is equivalent to a case where the aforementioned second distance determination condition is satisfied. In Step S115, the confirmation information transmitting part 125 transmits, to the remote control device 60, confirmation information for confirming whether or not the control instruction to the selected electronic device should be transmitted.

In subsequent Step S116, the control instruction transmitting part 121 determines whether or not the confirmation instruction is received from the remote control device 60. Then, when the control instruction transmitting part 121 receives a confirmation instruction from the remote control device 60, the control instruction transmitting part 121 advances the process to Step S117. On the other hand, when the control instruction transmitting part 121 does not receives the confirmation instruction from the remote control device 60, the control instruction transmitting part 121 advances the process from Step S116 to Step S118. In this case, remote control to the selected electronic device is not performed.

Thus, in a case where the second distance determination condition is satisfied, the confirmation information is transmitted to the remote control device 60 in Step S115. Then, the selected electronic device is remotely controlled subject to transmission of the confirmation instruction from the remote control device 60 to the relay server 100 in Step S116 in accordance with operation by the user. Consequently, when the user erroneously selects the electronic device to be remotely controlled, the control instruction can be prevented from being transmitted to an electronic device different from the electronic device intended by the user. Then, in a case where such prevention is attained, and the user desires, it is possible to remotely control the electronic device other than the electronic device that is the nearest from the remote control device 60.

11. Remote Control Processes Using Third Distance Determination Condition in Second Embodiment In accordance with a flowchart illustrated in FIG. 14, a procedure of remote control processes using the third distance determination condition, performed by the remote control device 60 and the relay server 100 will be described. In the third distance determination condition, determination as to whether or not a plurality of the electronic devices of the same kind as the selected electronic device exist is not performed, and therefore the same kind device determining part 123 is not required in a case where the third distance determination condition is used.

Figure 14:
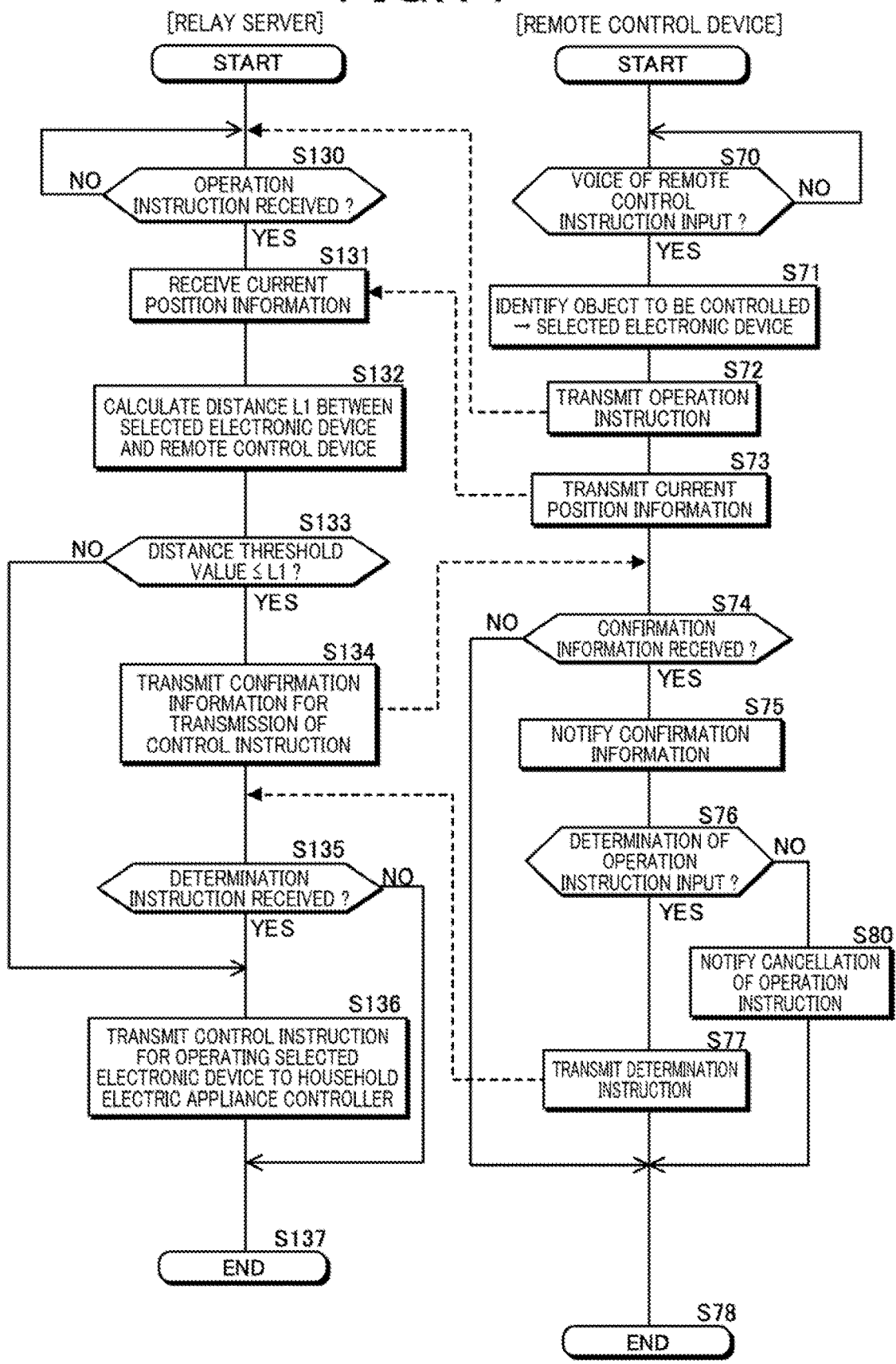
FIG. 14 is a flowchart of processes of remotely controlling the electronic device by the remote control system, by using the third distance determination condition.

Processes by the remote control device 60, indicated in Step S70 to S77, and S80 of FIG. 14 are similar to those of FIG. 12, and therefore detailed description will be omitted. When the same kind device determining part 123 of the relay server 100 receives an operation instruction from the remote control device 60 in Step S130, the same kind device determining part 123 advances the process to Step S131. In Step S131, the same kind device determining part 123 receives, from the remote control device 60, current position information indicating a current position of the remote control device 60.

In subsequent Step S132, the distance determining part 124 calculates a distance L1 between the remote control device 60 and the selected electronic device with reference to the current position information received in Step S131, and the electronic device registration information 141 acquired by the electronic device registration information acquiring part 122. The distance determining part 124 determines whether or not the distance L1 is equal to or larger than the distance threshold value. Then, when the distance L1 is equal to or larger than the distance threshold value, the distance determining part 124 advances the process to Step S134. Additionally, when the distance L1 is less than the distance threshold value, the distance determining part 124 advances the process to Step S136.

In Step S136, the control instruction transmitting part 121 transmits a control instruction for instructing remote control of the selected electronic device to the household electric appliance controller 52 assigned the selected electronic device. The household electric appliance controller 52 that receives the control instruction outputs a control signal by an infrared signal to the selected electronic device, so that remote control to the selected electronic device is implemented.

Herein, a case where it is determined that the distance L1 between the selected electronic device and the remote control device 60 is equal to or larger than the distance threshold value in Step S133 is equivalent to a case where the aforementioned third distance determination condition is satisfied. In Step S134, the confirmation information transmitting part 125 transmits confirmation information for confirming whether or not the control instruction to the selected electronic device should be transmitted to the selected electronic device.

In subsequent Step S135, the control instruction transmitting part 121 determines whether or not a confirmation instruction is received from the remote control device 60. Then, when the confirmation instruction is received from the remote control device 60, the control instruction transmitting part 121 advances the process to Step S136. On the other hand, when the confirmation instruction is not received from the remote control device 60, the control instruction transmitting part 121 advances the process from Step S135 to Step S137. In this case, remote control to the selected electronic device is not performed.

Thus, in a case where the third distance determination condition is satisfied, confirmation information is transmitted to the remote control device 60 in Step S134. Then, the selected electronic device is remotely controlled subject to transmission of the confirmation instruction from the remote control device 60 to the relay server 100 in accordance with operation by the user in Step S135. Consequently, when the user erroneously selects the electronic device to be remotely controlled, the control instruction can be prevented from being transmitted to an electronic device different from the electronic device intended by the user. Then, in a case where such prevention is attained, and the user desires, the electronic device separated by the distance threshold value or more from the remote control device 60 can be remotely controlled.

12. Other Embodiments

In the aforementioned first embodiment and second embodiment, as illustrated in FIG. 1 and FIG. 7, the electronic devices are remotely controlled through the household electric appliance controller 52. However, in a case where the electronic devices have respective IP addresses, a control instruction may be directly transmitted to each electronic device through the wireless router 51.

In the aforementioned first embodiment and second embodiment, the remote control devices 10, 60 are recognized by voice used as an instruction by a user from the microphones 23, 73. However, the remote control devices 10, 60 may be recognized by the input of the operation switches 21, 71.

In order to facilitate understanding of the present invention, FIGS. 1 and 2 and FIGS. 7, 8 and 10 are schematic diagrams illustrated by sectioning functional configurations of the remote control device 10, and the remote control system S by main processing contents, and the configurations of the remote control device 10 and the remote control system S may be configured by other sections. A process of each component may be performed by a single hardware unit, or may be performed by a plurality of hardware units. A process of each of the components illustrated in FIG. 4 and FIG. 5 may be performed by a single program, or may be performed by a plurality of programs.

REFERENCE SIGNS LIST 10a, 10b remote control device
20 control unit
30 CPU
31 operation instruction inputting part
32 control instruction transmitting part
33 same kind device determining part
34 current position recognizing part
35 distance determining part
36 confirmation information notifying part
40 memory
41 control program
42 electronic device registration information
50a to 50c building
51a to 51c wireless router
52a to 52c household electric appliance controller
53a to 53c lighting device
54a to 54c air conditioner
60a, 60b remote control device
70 control unit
80 CPU
81 operation instruction inputting part
82 operation instruction transmitting part
83 current position recognizing part
84 current position information transmitting part
85 confirmation information notifying part
90 memory
91 control program
92 electronic device name information
100 relay server
110 control unit
120 CPU
121 control instruction transmitting part
122 electronic device registration information acquiring part
123 same kind device determining part
124 distance determining part
125 confirmation information transmitting part
130 memory
131 control program
140 storage device
141 electronic device registration information
S remote control system

What is claimed is:

1. A remote control device comprising a CPU including:
an operation instruction inputting part that inputs an operation instruction to an electronic device registered in advance as an object to be remotely controlled; and
a control instruction transmitting part that transmits a control instruction based on the operation instruction to a selected electronic device, the selected electronic device being the electronic device selected as the object to be remotely controlled in the operation instruction, the CPU further comprising:
a same kind device determining part that determines whether or not a plurality of the electronic devices of the same kind as the selected electronic device exist;
a distance determining part that determines whether or not a distance between the selected electronic device and the remote control device is equal to or larger than a predetermined distance threshold value; and
a confirmation information notifying part that notifies, to a user via a speaker or a display of the remote control device, confirmation information for transmission of the control instruction before the transmission of the control instruction by the control instruction transmitting part, in a case where when the operation instruction is input by the operation instruction inputting part, the same kind device determining part determines that a plurality of the electronic devices of the same kind as the selected electronic device exist, and the distance determining part determines that the distance between the selected electronic device and the remote control device is equal to or larger than the distance threshold value, wherein
the control instruction transmitting part determines whether or not confirmation for transmission of the control signal to the selected electronic device is input from the user to the operation instruction inputting part,
when the confirmation is input, the control instruction transmitting part transmits the control instruction to the selected electronic device, when the confirmation is not input, the control instruction transmitting part does not transmit the control instruction to the selected electronic device.

2. The remote control device according to claim 1, wherein
the control instruction transmitting part transmits the control instruction, in a case where when the confirmation information notifying part notifies the confirmation information, the operation instruction inputting part inputs an instruction to determine the operation instruction to the selected electronic device, in accordance with the notification of the confirmation information.

3. The remote control device according to claim 1, wherein
the operation instruction inputting part inputs the operation instruction by voice.

4. A remote control device comprising
a CPU including:
an operation instruction inputting part that inputs an operation instruction to an electronic device registered in advance as an object to be remotely controlled; and
a control instruction transmitting part that transmits a control instruction based on the operation instruction to a selected electronic device, the selected electronic device being the electronic device selected as the object to be remotely controlled in the operation instruction, the CPU further comprising:
a same kind device determining part that determines whether or not a plurality of the electronic devices of the same kind as the selected electronic device exist;
a distance determining part that determines whether or not the selected electronic device is the electronic device that is the nearest from the remote control device among the electronic devices of the same kind as the selected electronic device, when the same kind device determining part determines that a plurality of the electronic devices of the same kind as the selected electronic device exist; and
a confirmation information notifying part that notifies confirmation information for transmission of the control instruction before the transmission of the control instruction by the control instruction transmitting part, in a case where when the operation instruction is input by the operation instruction inputting part, the same kind device determining part determines that a plurality of the electronic devices of the same kind as the selected electronic device exist, and the distance determining part does not determine that the selected electronic device is the electronic device that is the nearest from the remote control device among the electronic devices of the same kind as the selected electronic device.

5. The remote control device according to claim 4, wherein
the control instruction transmitting part transmits the control instruction, in a case where when the confirmation information notifying part notifies the confirmation information, the operation instruction inputting part inputs an instruction to determine the operation instruction to the selected electronic device, in accordance with the notification of the confirmation information.

6. The remote control device according to claim 4, wherein
the operation instruction inputting part inputs the operation instruction by voice.

7. A remote control device comprising
a CPU including:
an operation instruction inputting part that inputs an operation instruction to an electronic device registered in advance as an object to be remotely controlled; and
a control instruction transmitting part that transmits a control instruction based on the operation instruction to a selected electronic device, the selected electronic device being the electronic device selected as the object to be remotely controlled in the operation instruction, the CPU further comprising:
a distance determining part that determines whether or not a distance between the selected electronic device and the remote control device is equal to or larger than a predetermined distance threshold value; and
a confirmation information notifying part that notifies, to a user via a speaker or a display of the remote control device, confirmation information for transmission of the control instruction before the transmission of the control instruction by the control instruction transmitting part, in a case where when the operation instruction is input by the operation instruction inputting part, the distance determining part determines that the distance between the selected electronic device and the remote control device is equal to or larger than the distance threshold value, wherein
the control instruction transmitting part determines whether or not confirmation for transmission of the control signal to the selected electronic device is input from the user to the operation instruction inputting part,
when the confirmation is input, the control instruction transmitting part transmits the control instruction to the selected electronic device,
when the confirmation is not input, the control instruction transmitting part does not transmit the control instruction to the selected electronic device.

8. The remote control device according to claim 7, wherein
the control instruction transmitting part transmits the control instruction, in a case where when the confirmation information notifying part notifies the confirmation information, the operation instruction inputting part inputs an instruction to determine the operation instruction to the selected electronic device, in accordance with the notification of the confirmation information.

9. The remote control device according to claim 7, wherein
the operation instruction inputting part inputs the operation instruction by voice.

10. A remote control system comprising:
an electronic device registered in advance as an object to be remotely controlled;
a remote control device; and
a relay server that performs communication between the electronic device and the remote control device, wherein
remote control of the electronic device by the remote control device is performed through the relay server,
the remote control device has a first CPU including:
an operation instruction inputting part that inputs an operation instruction to the electronic device;
an operation instruction transmitting part that transmits the operation instruction to the relay server;
a current position recognizing part that recognizes a current position of the remote control device;

a current position information transmitting part that transmits, to the relay server, current position information indicating a current position of the remote control device recognized by the current position recognizing part; and a confirmation information notifying part that notifies confirmation information when receiving, from the relay server, the confirmation information for transmission of a control instruction to the electronic device based on the operation instruction, and the relay server has a second CPU including:

an electronic device registration information acquiring part that acquires electronic device registration information including a placement position of the electronic device;

a control instruction transmitting part that transmits the control instruction based on the operation instruction to a selected electronic device which is the electronic device selected as the object to be remotely controlled in the operation instruction, when the operation instruction is received from the remote control device;

a same kind device determining part that determines whether or not a plurality of the electronic devices of the same kind as the selected electronic device exist;

a distance determining part that determines whether or not a distance between the selected electronic device and the remote control device is equal to or larger than a predetermined distance threshold value, with reference to the current position information and the electronic device registration information; and a confirmation information transmitting part that transmits the confirmation information to the remote control device before the transmission of the control instruction by the control instruction transmitting part, in a case where when the operation instruction is received from the remote control device, the same kind device determining part determines that a plurality of the electronic devices of the same kind as the selected electronic device exist, and the distance determining part determines that the distance between the selected electronic device and the remote control device is equal to or larger than the distance threshold value.

11. A remote control system comprising:

an electronic device registered in advance as an object to be remotely controlled;

a remote control device; and a relay server that performs communication between the electronic device and the remote control device, wherein remote control of the electronic device by the remote control device is performed through the relay server, the remote control device has a first CPU including:

an operation instruction inputting part that inputs an operation instruction to the electronic device;

an operation instruction transmitting part that transmits the operation instruction to the relay server;

a current position recognizing part that recognizes a current position of the remote control device;

a current position information transmitting part that transmits, to the relay server, current position information indicating a current position of the remote control device recognized by the current position recognizing part; and a confirmation information notifying part that notifies confirmation information when receiving, from the relay server, the confirmation information for transmission of a control instruction to the electronic device based on the operation instruction, and the relay server has a second CPU including:

an electronic device registration information acquiring part that acquires electronic device registration information including a placement position of the electronic device;

a control instruction transmitting part that transmits the control instruction based on the operation instruction to a selected electronic device which is the electronic device selected as the object to be remotely controlled in the operation instruction, when the operation instruction is received from the remote control device;

a same kind device determining part that determines whether or not a plurality of the electronic devices of the same kind as the selected electronic device exist;

a distance determining part that determines whether or not the selected electronic device is the electronic device that is the nearest from the remote control device among the electronic devices of the same kind as the selected electronic device, with reference to the current position information and the electronic device registration information, when the same kind device determining part determines that a plurality of the electronic devices of the same kind as the selected electronic device exist; and a confirmation information transmitting part that transmits the confirmation information for transmission of the control instruction to the remote control device before the transmission of the control instruction by the control instruction transmitting part, in a case where when the operation instruction is received from the remote control device, the same kind device determining part determines that a plurality of the electronic devices of the same kind as the selected electronic device exist, and the distance determining part does not determine that the selected electronic device is the electronic device that is the nearest from the remote control device among the electronic devices of the same kind as the selected electronic device.

12. A remote control system comprising:

an electronic device registered in advance as an object to be remotely controlled;

a remote control device; and a relay server that performs communication between the electronic device and the remote control device, wherein remote control of the electronic device by the remote control device is performed through the relay server, the remote control device has a first CPU including:

an operation instruction inputting part that inputs an operation instruction to the electronic device;

an operation instruction transmitting part that transmits the operation instruction to the relay server;

a current position recognizing part that recognizes a current position of the remote control device;

a current position information transmitting part that transmits, to the relay server, current position information indicating a current position of the remote control device recognized by the current position recognizing part; and a confirmation information notifying part that notifies confirmation information when receiving, from the relay server, the confirmation information for transmission of a control instruction to the electronic device based on the operation instruction, and the relay server has a second CPU including:
an electronic device registration information acquiring part that acquires electronic device registration information including a placement position of the electronic device;
a control instruction transmitting part that transmits the control instruction based on the operation instruction to a selected electronic device which is the electronic device selected as the object to be remotely controlled in the operation instruction, when the operation instruction is received from the remote control device;
a distance determining part that determines whether or not a distance between the selected electronic device and the remote control device is equal to or larger than a predetermined distance threshold value, with reference to the current position information and the electronic device registration information; and
a confirmation information transmitting part that transmits the confirmation information to the remote control device before the transmission of the control instruction by the control instruction transmitting part, in a case where when the operation instruction is received from the remote control device, the distance determining part determines that the distance between the selected electronic device and the remote control device is equal to or larger than the distance threshold value.

* * * * *